(12) United States Patent
Goel et al.

(10) Patent No.: US 10,939,400 B2
(45) Date of Patent: Mar. 2, 2021

(54) TIME SYNCHRONIZATION TECHNIQUES FOR WIRELESS COMMUNICATIONS

(71) Applicant: QUALCOMM Incorporated, San Diego, CA (US)

(72) Inventors: Satashu Goel, San Diego, CA (US); Junyi Li, Chester, NJ (US); Karl Georg Hampel, Hoboken, NJ (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 16/221,198

(22) Filed: Dec. 14, 2018

(65) Prior Publication Data

US 2019/0191403 A1 Jun. 20, 2019

Related U.S. Application Data

(60) Provisional application No. 62/607,888, filed on Dec. 19, 2017, provisional application No. 62/607,890, filed on Dec. 19, 2017.

(51) Int. Cl.
*H04L 7/00* (2006.01)
*H04L 27/26* (2006.01)
(Continued)

(52) U.S. Cl.
CPC ...... *H04W 56/0045* (2013.01); *H04B 17/327* (2015.01); *H04B 17/336* (2015.01); *H04L 7/007* (2013.01); *H04L 27/261* (2013.01); *H04L 27/2656* (2013.01); *H04L 27/2666* (2013.01); *H04L 27/2678* (2013.01); *H04L 27/2695* (2013.01); *H04W 56/0015* (2013.01); *H04W 56/0065* (2013.01); *H04L 25/0216* (2013.01)

(58) Field of Classification Search
CPC .......................... H04W 56/0015; H04L 7/007
See application file for complete search history.

(56) References Cited

U.S. PATENT DOCUMENTS

2008/0253310 A1 10/2008 Iizuka et al.
2009/0003304 A1 1/2009 Kikuchi et al.

OTHER PUBLICATIONS

International Search Report and Written Opinion—PCT/US2018/066032—ISA/EPO—dated Mar. 29, 2019.

*Primary Examiner* — Angel T Brockman
(74) *Attorney, Agent, or Firm* — Holland & Hart LLP/ Qualcomm Incorporated

(57) ABSTRACT

Methods, systems, and devices for wireless communications are described that provide time synchronization via wireless communications for devices that use strict timing synchronization. A user equipment (UE) may obtain time synchronization via a wireless connection between the UE and a timing source that may be associated with a base station (or another wireless device). In some cases, the timing source may be synchronized at the UE by determining, using periodic synchronization resources, a propagation delay between the UE and the base station that is based on a timing of a line-of-sight instance of a transmission between the base station and the UE. The propagation delay may be used to determine a timing advance value for use in timing synchronization. One or more devices may be coupled with the UE and the UE may provide commands to the one or more devices that are synchronized according to the synchronized timing source.

30 Claims, 22 Drawing Sheets

(51) Int. Cl.
  *H04W 56/00* (2009.01)
  *H04B 17/336* (2015.01)
  *H04B 17/327* (2015.01)
  *H04L 25/02* (2006.01)

TIME SYNCHRONIZATION TECHNIQUES FOR WIRELESS COMMUNICATIONS

CROSS REFERENCES

The present application for patent claims the benefit of U.S. Provisional Patent Application No. 62/607,888 by GOEL, et al., entitled "TIME SYNCHRONIZATION TECHNIQUES FOR WIRELESS COMMUNICATIONS," filed Dec. 19, 2017, and U.S. Provisional Patent Application No. 62/607,890 by GOEL, et al., entitled "MODIFYING SIGNALING PERIODICITY FOR TIME SYNCHRONIZATION," filed Dec. 19, 2017, each of which are assigned to the assignee hereof, and expressly incorporated herein.

BACKGROUND

The following relates generally to wireless communication and time synchronization techniques for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support time synchronization techniques for wireless communications. Generally, the described techniques provide for time synchronization via a wireless connection between a user equipment (UE) and a timing source. In some cases, the timing source may be associated with a base station (or other wireless device) that establishes a wireless connection with the UE and provides timing information for one or more end devices that may be associated with the UE. In some cases, the timing source may be synchronized by determining a propagation delay between the UE and the base station, and the propagation delay may be used to determine a timing advance value for use in timing synchronization.

In some cases, a base station may transmit a signal to a UE, and the UE may receive a number of instances of the signal, which may result from multiple different line-of-sight (LOS) and non-LOS signal paths between the base station and the UE. The UE may, in some cases, identify a reception time of an earliest instance of the received signal and determine the propagation delay associated with the earliest instance, which may correspond to a LOS path of the signal. The timing of the earliest instance of the signal may be in advance of a peak energy level of the signal that is received at the UE. The UE may transmit one or more signals based on the timing of the earliest instance of the signal, such as a response signal to the base station indicating the propagation delay of the earliest instance or a command to an end device. In some cases, the base station may configure periodic resources for use in performing time synchronization, the signal to the UE may be transmitted during the configured periodic resources.

A method of wireless communication is described. The method may include receiving, at a UE and at a plurality of times, a corresponding plurality of instances of a first signal from a base station, identifying a first reception time corresponding to an earliest instance of the first signal being received at the UE, the first reception time being in advance of a second reception time corresponding to one or more later instances of the first signal being received at the UE, determine that an aggregate energy level of the one or more later instances of the first signal is higher than an energy level of the earliest instance of the first signal being received at the UE, determining a time difference between the first reception time and the second reception time, and reporting the time difference to the base station.

An apparatus for wireless communication is described. The apparatus may include means for receiving, at a UE and at a plurality of times, a corresponding plurality of instances of a first signal from a base station, means for identifying a first reception time corresponding to an earliest instance of the first signal being received at the UE, the first reception time being in advance of a second reception time corresponding to one or more later instances of the first signal being received at the UE, means for determining that an aggregate energy level of the one or more later instances of the first signal is higher than an energy level of the earliest instance of the first signal being received at the UE, means for determining a time difference between the first reception time and the second reception time, and means for reporting the time difference to the base station.

Another apparatus for wireless communication is described. The apparatus may include a processor, memory in electronic communication with the processor, and instructions stored in the memory. The instructions may be operable to cause the processor to receive, at a UE and at a plurality of times, a corresponding plurality of instances of a first signal from a base station, identify a first reception time corresponding to an earliest instance of the first signal being received at the UE, the first reception time being in advance of a second reception time corresponding to one or more later instances of the first signal being received at the UE, determine that an aggregate energy level of the one or more later instances of the first signal is higher than an energy level of the earliest instance of the first signal being received at the UE, determine a time difference between the first reception time and the second reception time, and report the time difference to the base station.

A non-transitory computer-readable medium for wireless communication is described. The non-transitory computer-readable medium may include instructions operable to cause a processor to receive, at a UE and at a plurality of times, a corresponding plurality of instances of a first signal from a base station, identify a first reception time corresponding to an earliest instance of the first signal being received at the UE, the first reception time being in advance of a second reception time corresponding to one or more later instances of the first signal being received at the UE, determine that an aggregate energy level of the one or more later instances of the first signal is higher than an energy level of the earliest instance of the first signal being received at the UE, determine a time difference between the first reception time and the second reception time, and report the time difference to the base station.

Some examples of the method, apparatus, and non-transitory computer-readable medium described above may further include processes, features, means, or instructions for transmitting a third signal to a device coupled with the UE, a timing of the third signal based at least in part on the first reception time.

In some examples of the method, apparatus, and non-transitory computer-readable medium described above, the reporting the time difference to the base station may include determining a first timing advance and a second timing advance, the first timing advance corresponding to a first propagation delay between when the base station transmits the first signal and the second reception time, and the second timing advance corresponding to a second propagation delay between when the base station transmits the first signal and the first reception time, and reporting at least one of the first timing advance and the second timing advance to the base station. In some examples of the method, apparatus, and non-transitory computer-readable medium described above, the first propagation delay corresponds to one or more non-line-of-sight paths of the first signal between the base station and the UE, and the second propagation delay corresponds to a line-of-sight path between the base station and the UE. In some examples of the method, apparatus, and non-transitory computer-readable medium described above, the first timing advance corresponds to a first time adjustment that provides that a majority of received energy for transmissions between the UE and the base station may be within a cyclic prefix duration configured for transmission between the UE and the base station, and the second timing advance corresponds to a second time adjustment that compensates for the second propagation delay.

In some examples of the method, apparatus, and non-transitory computer-readable medium described above the determining the time difference between the first reception time and the second reception time includes one or more of measuring each of the first reception time and the second reception time and calculating the time difference, or determining the time difference based at least in part on a cyclic prefix duration of the first signal.

Some examples of the method, apparatus, and non-transitory computer-readable medium described above may further include processes, features, means, or instructions for receiving a configuration signal identifying periodic resources scheduled for a timing synchronization procedure, and the first signal from the base station may be transmitted in a first instance of the periodic resources according to the timing synchronization procedure. In some examples of the method, apparatus, and non-transitory computer-readable medium described above the periodic resources may have a periodicity based at least in part on a timing accuracy threshold by which the UE is to operate. Additionally or alternatively, the periodicity of the periodic resources may be based at least in part on a reference signal received power (RSRP), a signal-to-noise ratio (SNR), a signal-to-interference-and-noise ratio (SINR), a reference signal received quality (RSRQ), a bandwidth parameter, a throughput parameter, or a combination thereof.

Some examples of the method, apparatus, and non-transitory computer-readable medium described above may further include processes, features, means, or instructions for configuring a timer function of a local wired interface of the UE based at least in part on a clock offset with a master clock associated with the base station, where the clock offset is based at least in part on the time difference. Some examples of the method, apparatus, and non-transitory computer-readable medium described above may further include processes, features, means, or instructions for providing a timing control signal to a device connected to the UE via the local wired interface, wherein the timing control signal may be based at least in part on the timer function. In some examples of the method, apparatus, and non-transitory computer-readable medium described above, the timer function may be a precision timing protocol (PTP) function. In some examples of the method, apparatus, and non-transitory computer-readable medium described above, the device may be an end device connected to the local wired interface and controlled by the UE.

Some examples of the method, apparatus, and non-transitory computer-readable medium described above may further include processes, features, means, or instructions for determining a frame boundary for communications with the base station based at least in part on the second reception time. In some examples of the method, apparatus, and non-transitory computer-readable medium described above, the first signal comprises at least one of a primary synchronization signal, a secondary synchronization signal, a system information block, a sounding reference signal, a positioning reference signal, or any combination thereof.

A method of wireless communication is described. The method may include transmitting a first signal to a UE, receiving, from the UE, an indication of a time difference between a first reception time and a second reception time of the first signal at the UE, where the first reception time corresponds to an earliest instance of the first signal being received at the UE, and the a second reception time corresponds to one or more later instances of the first signal being received at the UE, and adjusting a time offset associated with the UE based at least in part on the indication of the time difference.

An apparatus for wireless communication is described. The apparatus may include means for transmitting a first signal to a UE, means for receiving, from the UE, an indication of a time difference between a first reception time and a second reception time of the first signal at the UE, where the first reception time corresponds to an earliest instance of the first signal being received at the UE, and the second reception time corresponds to one or more later instances of the first signal being received at the UE, and means for adjusting a time offset associated with the UE based at least in part on the indication of the time difference.

Another apparatus for wireless communication is described. The apparatus may include a processor, memory in electronic communication with the processor, and instructions stored in the memory. The instructions may be operable to cause the processor to transmit a first signal to a UE, receive, from the UE, an indication of a time difference between a first reception time and a second reception time of the first signal at the UE, where the first reception time corresponds to an earliest instance of the first signal being received at the UE, and the second reception time corresponds to one or more later instances of the first signal being received at the UE, and adjust a time offset associated with the UE based at least in part on the indication of the time difference.

A non-transitory computer-readable medium for wireless communication is described. The non-transitory computer-readable medium may include instructions operable to cause a processor to transmit a first signal to a UE, receive, from the UE, an indication of a time difference between a first reception time and a second reception time of the first signal at the UE, where the first reception time corresponds to an earliest instance of the first signal being received at the UE, and the second reception time corresponds to one or more later instances of the first signal being received at the UE, and adjust a time offset associated with the UE based at least in part on the indication of the time difference.

Some examples of the method, apparatus, and non-transitory computer-readable medium described above may further include processes, features, means, or instructions for transmitting a timing advance command to the UE to adjust an uplink timing of the UE, wherein the timing advance command is based at least in part on the time difference received from the UE. Some examples of the method, apparatus, and non-transitory computer-readable medium described above may further include processes, features, means, or instructions for transmitting a timing offset to the UE based at least in part on the time difference received from the UE, wherein the timing offset indicates an adjustment to a timing control signal for a device connected to the UE.

In some examples of the method, apparatus, and non-transitory computer-readable medium described above, the first reception time corresponds to a line-of-sight path of the first signal between the UE and the base station, and the second reception time may be associated with one or more non-line-of-sight paths between the UE and the base station.

Some examples of the method, apparatus, and non-transitory computer-readable medium described above may further include processes, features, means, or instructions for scheduling periodic resources for a timing synchronization procedure to be performed with the UE, and the first signal may be transmitted to the UE in a first instance of the periodic resources according to the timing synchronization procedure. In some cases, the periodic resources may have a periodicity based at least in part on a timing accuracy threshold by which the UE is to operate. Some examples of the method, apparatus, and non-transitory computer-readable medium described above may further include processes, features, means, or instructions for transmitting, prior to transmitting the first signal, a configuration signal to the UE identifying the periodic resources.

Some examples of the method, apparatus, and non-transitory computer-readable medium described above may further include processes, features, means, or instructions for configuring a timer function of a local wired interface of the UE based at least in part on the time difference received from the UE. In some examples of the method, apparatus, and non-transitory computer-readable medium described above, the timer function may be a precision timing protocol (PTP) function. In some examples of the method, apparatus, and non-transitory computer-readable medium described above, the timer function provides a timing control signal to a device connected to the UE via the local wired interface.

DETAILED DESCRIPTION

Figure 1:
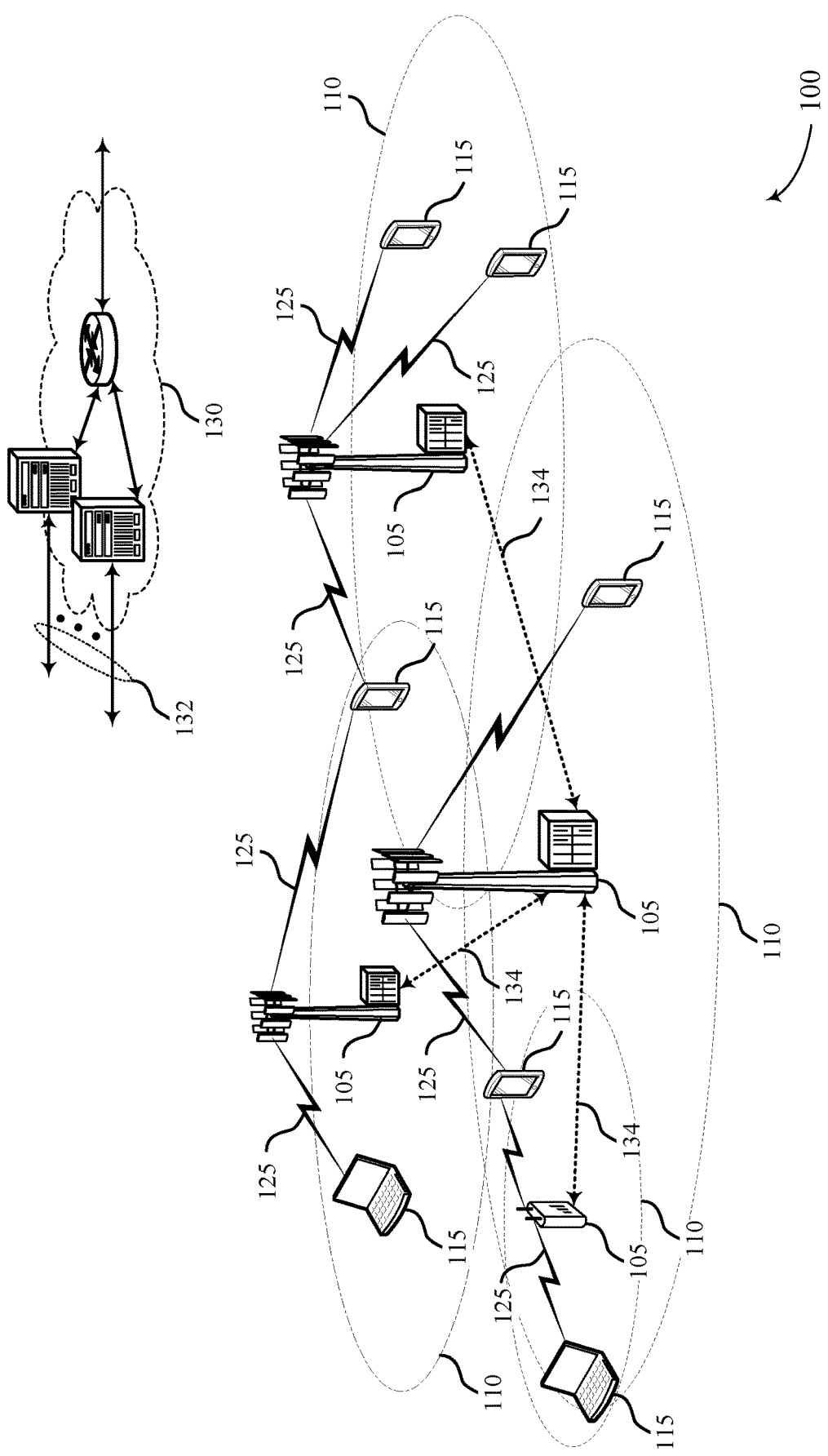
FIG. 1 illustrates an example of a system for wireless communication that supports time synchronization techniques for wireless communications in accordance with aspects of the present disclosure.

Wireless communication systems may include various reference signals, synchronization signals, and the like, that provide timing information to devices operating on the wireless network. Typically, these timing signals (timing synchronization signals) are used by the wireless devices to ensure frame/subframe boundary timing that supports uplink/downlink signals being received within the uplink/downlink frame, respectively. Therefore, the timing synchronization techniques are generally sufficient to allow for wireless communications. However, the timing synchronization techniques used in wireless communications may not provide strict enough synchronization for use in control timing (e.g., synchronization) of other devices (such as industrial devices) that are precisely time-synchronized with each other. Such devices, which may be referred to as end devices, may include industrial machines, automated functions, and the like, which rely on strict timing synchronization protocols (such as the IEEE 1588 precision timing protocol (PTP) or similar techniques) to ensure that the end devices are synchronized for control and operations. Such end devices may include, for example, devices that use multi-axes synchronized motion control, such as may be used in printing machines or assembly lines, for example.

In some cases, timing synchronization may be implemented in such systems over an Ethernet network of a local wired communication network to synchronize the operations and movements of, for example, machines that are end devices in the local communication network. Implementation of timing synchronization may include dedicated hardware support for deterministic delay calculations (e.g., estimation of the round-trip delay of packets in the local communication network using an Ethernet switch, etc.). Such systems, however, do not conventionally rely on wireless communication systems for timing synchronization.

Moreover, timing synchronization in a wireless communications system may be an on-demand, or trigger-based process. For example, the base station may transmit a request message to a user equipment (UE) that starts the timing synchronization (or update) procedure with the UE. The UE may receive the request message and then begin to search for and measure timing synchronization signals from the base station. The UE may then transmit a timing measurement signal to the base station and receive a timing update command from the base station, e.g., a timing advance command, and the like. In some aspects, this timing synchronization (or update) procedure may introduce a time delay that limits the timing accuracy degree achievable for such techniques.

Various techniques as described herein provide for time synchronization via wireless communications for devices that use relatively strict timing synchronization. In some cases, a UE may obtain time synchronization via a wireless connection between the UE and a timing source that may be associated with a base station (or another wireless device). In some cases, the timing source may be synchronized by determining a propagation delay between the UE and the base station, and the propagation delay may be used to determine a timing advance value for use in timing synchronization.

In some cases, a base station may transmit a signal to a UE, and the UE may receive a number of instances of the signal, which may result from multiple different line-of-sight (LOS) and non-LOS signal paths between the base station and the UE. The UE may, in some cases, identify a reception time of an earliest instance of the received signal and determine the propagation delay associated with the earliest instance, which may correspond to a LOS path of the signal. The timing of the earliest instance of the signal may be in advance of a peak energy level of the signal that is received at the UE. The UE may transmit one or more signals based on the timing of the earliest instance of the signal, such as a response signal to the base station indicating the propagation delay of the earliest instance or a command to an end device. The UE may use the timing of the peak energy level of the signal for other wireless communications synchronization with the wireless communications network, such as for frame/subframe boundary timing that supports uplink/downlink signals being received within uplink/downlink frames, respectively transmitted between the base station and the UE. In some cases, a timing offset for a timing control signal of the end device may be adjusted based at least in part on a time difference between the earliest instance of the signal and the peak energy level time. Further, in some cases, the base station may configure periodic resources for use in performing time synchronization, the signal to the UE may be transmitted during the configured periodic resources.

Using such a wireless connection for timing synchronization may provide a number of advantages, including system flexibility and accurate timing synchronization over wireless links through a UE that is coupled with one or more end devices. In some cases, it may be desirable to provide one or more end devices (e.g., one or more automated manufacturing machines that rely on timing precision measured in the tens to hundreds of nanoseconds) at a location that does not have communications cabling. Providing for such timing synchronization using cellular wireless communications may allow for flexibility in the location of such devices with reduced cost and time that may be required to install a wired connection to the devices. In such cases, a UE may synchronize with a master clock that is coupled with a base station and provide a timing source for the one or more end devices that are connected to the UE.

Aspects of the disclosure are initially described in the context of a wireless communications system. Various examples of timing synchronization via wireless transmissions and then discussed. Aspects of the disclosure are further illustrated by and described with reference to apparatus diagrams, system diagrams, and flowcharts that relate to time synchronization techniques for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, one or more of the UEs 115 may be coupled with one or more end devices that utilize strict timing synchronization with a timing source associated with a base station 105, and such UEs 115 may use timing synchronization techniques as discussed herein to provide time synchronization for the end device.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some aspects, a UE 115 may receive a signal (e.g., a timing synchronization signal) from a base station 105 over a cellular wireless communication link. The UE 115 may receive a number of instances of the signal, which may result from multiple different line-of-sight (LOS) and non-LOS signal paths between the base station 105 and the UE 115. The UE 115 may, in some cases, identify a reception time of an earliest instance of the received signal and determine the propagation delay associated with the earliest instance, which may correspond to a LOS path of the signal. The timing of the earliest instance of the signal may be in advance of a peak energy level of the signal that is received at the UE 115. The UE 115 may transmit one or more signals based on the timing of the earliest instance of the signal, such as a response signal to the base station 105 indicating the propagation delay of the earliest instance or a command to an end device. The UE 115 may use the timing of the peak energy level of the signal for other wireless communications synchronization with the wireless communications system 100, such as for frame/subframe boundary timing that supports uplink/downlink signals being received within uplink/downlink frames, respectively transmitted between the base station 105 and the UE 115.

In some cases, a base station 105 may determine that a UE 115 is to operate within a timing accuracy threshold. The base station 105 may schedule periodic resources for timing synchronization procedures to be performed with the UE 115, the periodic resources having a periodicity based at least in part on the timing accuracy threshold. The base station 105 may transmit a configuration signal to the UE 115 identifying the periodic resources. In such cases, the UE 115 may receive the configuration signal identifying periodic resources scheduled for the timing synchronization procedure, and may perform the timing synchronization procedure with the base station 105 according to the periodicity and using the periodic resources.

Figure 2:
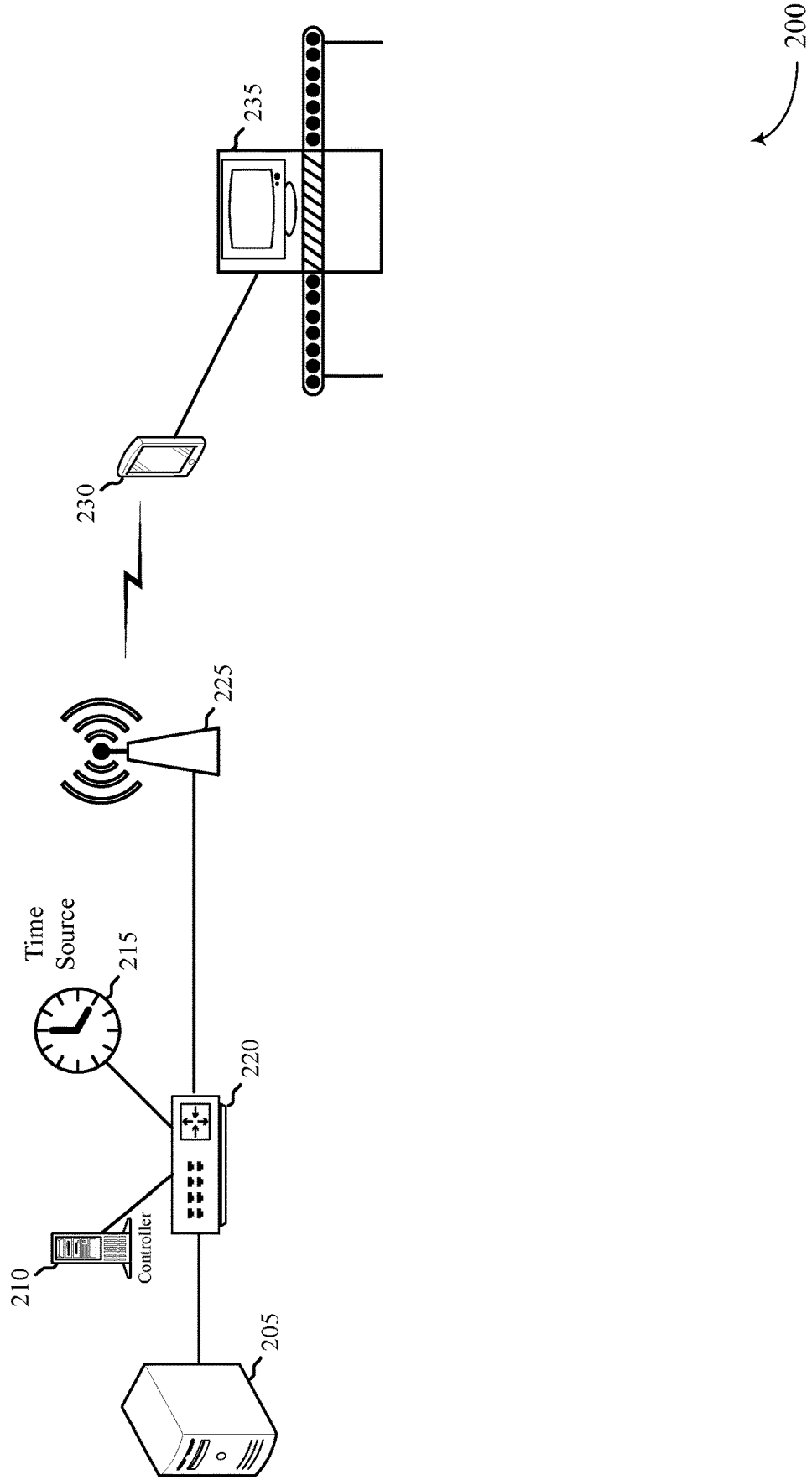
FIG. 2 illustrates an example of a portion of a wireless communications system that supports time synchronization techniques for wireless communications in accordance with aspects of the present disclosure.

FIG. 2 illustrates an example of a portion of a wireless communications system 200 that supports time synchronization techniques for wireless communications in accordance with various aspects of the present disclosure. In some examples, wireless communications system 200 may implement aspects of wireless communications system 100. In some cases, wireless communications system 200 provides one example of timing synchronization based on a propagation delay of an earliest received instance of a signal that may be used for end-to-end timing synchronization over a cellular system.

The example of FIG. 2 is one example of an industrial application where timing synchronization may be employed. In some aspects, component(s) of wireless communications system 200 may be part of a core network in an LTE/LTE-A, mmW, NR, etc. network, such as is described with respect to wireless communications system 100. In some aspects, one or more devices operating in such a network, including industrial-grade devices, may require timing synchronization satisfying a defined accuracy level.

In some aspects, timing synchronization techniques in a local communication network may use PTP techniques (or a similar synchronization protocol) to provide relatively strict timing synchronization. PTP techniques may include a delay response mechanism where delay request-response messages are exchanged over the local communications network to identify timing offsets from the master time at each device. The request-response exchange may identify the transit delays (e.g., the time between message transmission and message reception) and, in the instance where there is an intermediary device acting as a transparent clock, the residence time (e.g., the time between when the intermediary device receives a message and when the intermediary device relays the message).

In some aspects, timing synchronization techniques in a cellular network may include various reference signals, synchronization signals, and the like, that provide timing information to devices operating on the wireless network. Typically, the timing signals (timing synchronization signals) are used by the wireless devices to ensure frame/subframe boundary timing that supports uplink/downlink signals being received within the uplink/downlink frame, respectively.

Therefore, timing synchronization in a local communication network with industrial applications may be different than and have a different purpose than timing in a cellular network. Timing in an industrial setting may be designed to ensure that each device performs its function at a precise time, while timing in a cellular network is generally more lenient, providing windows of time during which devices may communicate with each other. In wireless communications system 200, aspects of the described techniques may combine one or more techniques of timing synchronization in a local communication network with those of a cellular wireless network.

As discussed above, cellular network timing synchronization may be based on times at which a UE 230 or a base station 225 receive a peak energy of a received signal, which may be after a first received instance of the received signal. Such a difference may result from the signal taking multiple non-LOS paths to the UE 230 such that multiple non-LOS instances of the received signal have a higher aggregate energy than a LOS instance of the received signal. In some cases, timing advance information based on cellular network timing synchronization thus may not provide sufficient accuracy for precision timing that may be required by an end device 235.

With respect to the specific example of FIG. 2, wireless communications system 200 may include a server 205, a controller 210, a time source 215, a switch 220, and a base station 225 that are connected over a local communication network. Generally, the server 205 may provide various network functionalities, such as running one or more conventional server functions. The controller 210 and time source 215 may generally provide timing synchronization signals for the components of the local communication network and to base station 225, e.g., via the switch 220. For example, controller 210 may receive timing signals from time source 215 and configure one or more messages, signals, etc., to carry or otherwise convey an indication of timing information. The timing information may be absolute timing information, e.g., an indication of the actual time, or relative timing information e.g., an indication of a time with respect to a defined event, reference time, start time, etc.

Base station 225 may receive timing information from the controller 210, time source 215, or both, and use the timing information when transmitting various timing synchronization signals. For example, the base station 225 may transmit timing synchronization signals that include any combination of reference signal(s), synchronization signal(s), beam management signal(s), and the like, across a wireless channel to UEs within its coverage area, such as UE 230. The timing synchronization signals may carry or otherwise convey an indication of timing information, e.g., absolute or relative timing information.

In some aspects, UE 230 may be operating within a timing accuracy threshold. In the non-limiting example of FIG. 2, this may include the UE 230 providing a timing control signal to device 235, where the device 235 requires strict timing synchronization to perform a given task, e.g., movement of components of device 235 that must be synchronized. In other aspects, the UE 230 may be operating within a timing accuracy threshold based on other scenarios, e.g., in a vehicle-based deployment where coordination of sensor information, safety messages, and the like, have stringent latency and reliability requirements.

In some aspects, UE 230 may be a dual-interface UE that is configured with a cellular wireless communication interface and a local wired interface. The UE 230 may receive the timing synchronization signals from base station 225 over the cellular interface and communicate with the end device 235 over the local wired interface. In some aspects, the local wired interface is a direct connection (e.g., not a local communication network). In other aspects, the local wired interface is a configured for communications over a local communication network. The local wired interface may include a timer function (e.g., one or more clocks, timers, etc.) that UE 230 configures with the timing synchronization signals received from base station 225. UE 230 may transmit a timing control signal to end device 235 over the local wired interface. For example, UE 230 may generate the timing control signals based on the timer function. Accordingly, UE 230 may manage or control aspects of end device 235 operations using the timing control signals, which are based on the timing synchronization signals received from base station 225.

The UE 230 may, in some cases, generate timing controls for the end device 235 based on reception times of a signal from the base station 225. In some cases, the UE 230 may identify a reception time of an earliest instance of the received signal and determine the propagation delay associated with the earliest instance, which may correspond to a LOS path of the signal. The UE 230 may transmit one or more signals based on the timing of the earliest instance of the signal, such as a response signal to the base station 225 indicating the propagation delay of the earliest instance or a command to the end device 235.

In some aspects, UE 230 may signal that it is operating within the timing accuracy threshold. This may include an explicit signal where the UE 230 conveys an indication of the timing accuracy threshold, a flag identifying the UE 230 are operating with the timing accuracy threshold, and the like. In some aspects, UE 230 may signal that it is operating within the timing accuracy based on the type of UE 230. For example, when initially registering with base station 225 and/or a network function, UE 230 may indicate a UE-type field, where UEs having such a UE-type field are associated with operations within the timing accuracy threshold. In some aspects, UE 230 may signal that it is operating with the timing accuracy threshold based on the type of data that UE 230 is communicating. For example, certain data types may be associated with stringent timing accuracy requirements, such as sensor data/safety messages in a vehicle-based deployment, timing coordination information for an industrial machine, and the like.

In some aspects, base station 225 may determine that the UE 230 is operating in the timing accuracy threshold. For example, base station 225 may make the determination based on any of the described signaling techniques from the UE 230 discussed herein. In some aspects, base station 225 may make the determination based on a signal received from a network entity, such as from a component or function of a core network. Generally, the timing accuracy threshold may refer to a degree of timing accuracy that the UE 230 is operating within, for example, expected accuracy from 10-100 micro-seconds (us), 1-10 us, and the like.

Based on the determination that UE 230 is operating within the timing accuracy threshold, base station 225 may schedule periodic resources for a timing synchronization procedure. The periodic resources may include pre-allocated resources that can be used for transmission of timing measurement signal(s), timing advance commands, and the like. The periodic resources being scheduled by base station 225 may omit the requirement for the base station 225 to trigger the timing synchronization (or update) procedure with UE 230, e.g., the UE 230 and base station 225 may automatically and continuously communicate the timing measurement signal(s), timing advance commands, and the like using the periodic resources. The base station 225 may transmit a signal to UE 230 identifying the periodic resources, such as in a grant message. Thus, the grant message may be a persistent grant message or semi-persistent grant message.

In some aspects, the periodicity of the scheduled periodic resources may be selected based on the timing accuracy threshold that UE 230 is operating within. For example, the periodicity of the periodic resources may be increased (e.g., the period may be shorter or the resources may occur more frequently) when the timing accuracy threshold reduces (e.g., as the timing accuracy requirements of UE 230 becomes more stringent). Conversely, the periodicity of the periodic resources may be reduced (e.g., the period may be longer or the resources may occur less frequently) when the timing accuracy threshold increased (e.g., as the timing accuracy requirements of UE 230 become less stringent). This may support more frequent and finer granularity timing synchronization for UE 230.

Additionally, in some aspects, the periodicity of the scheduled periodic resources may be further selected based on network conditions (e.g., channel quality conditions between the UE 230 and the base station 225). Thus, as the network conditions deteriorate, the periodicity of the scheduled periodic resources may increase. Conversely, as the network conditions improve, the periodicity of the scheduled periodic resources may decrease. For example, base station 225 may measure or otherwise determine that metric (s) of the cellular wireless communication link satisfy a threshold. Examples of the metric(s) include, but are not limited to, any combination of a reference signal received power (RSRP), a signal-to-noise ratio (SNR), a signal-to-interference-and-noise ratio (SINR), a reference signal received quality (RSRQ), a bandwidth parameter, a throughput parameter, and the like. When the base station 225 determines that the metric(s) satisfy the threshold, the periodic resources may be scheduled for a given periodicity. Satisfaction of different thresholds may result in the use of different periodicities.

In some aspects, the signals used for timing measurements (e.g., primary synchronization signal (PSS)/secondary synchronization signal (SSS)/positioning reference signal (PRS) in downlink, sounding reference signal (SRS) in uplink) may be periodic. The measurement of time difference, e.g., using time of first arrival, may be periodic. This may determine the periodicity of control signals to control time synchronization. The periodicity may be adaptive, based on a performance requirement, or network parameters. Examples of the performance requirement may include the accuracy of time synchronization, e.g., 1 μs vs 10 μs. Examples of the network parameters may include SINR (at the UE 230/base station 225), bandwidth of synchronization signals (e.g., PRS), periodicity of signals (e.g., PRS), accuracy of measurement and reporting. Accordingly, modification of the periodicity of measurement and/or reporting of timing of synchronization signals, may be based on performance or network parameters.

Figure 3A:
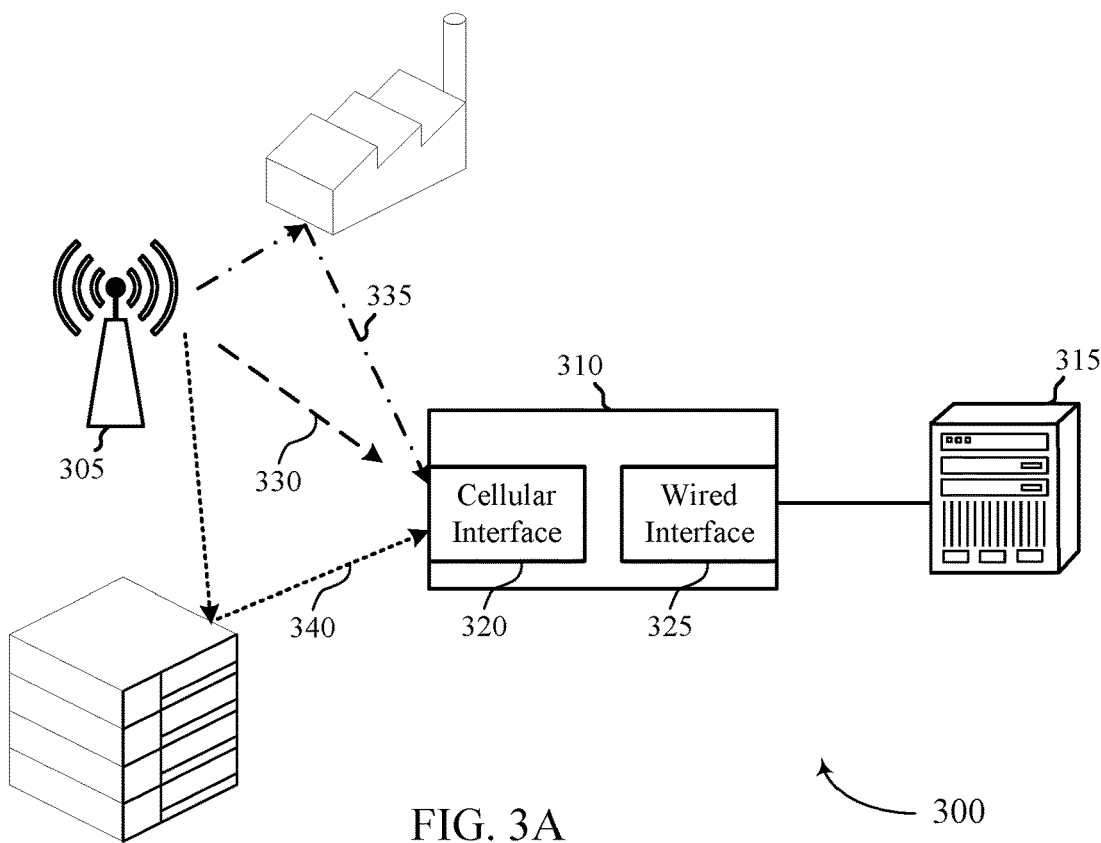
FIG. 3A illustrates an example of a portion of a wireless communication network that supports time synchronization techniques for wireless communications in accordance with aspects of the present disclosure.

FIG. 3A illustrates another example of a portion of a wireless communication network 300 that supports time synchronization techniques for wireless communications in accordance with various aspects of the present disclosure. In some examples, wireless communication network 300 may implement aspects of wireless communications system 100 or 200. Wireless communication network 300 may include a base station 305, a UE 310, and a device 315, which may be examples of the corresponding devices described herein.

Generally, base station 305 may transmit a variety of signals carrying or otherwise conveying timing synchronization signals. The timing synchronization signals may include any combination of reference signal(s), synchronization signal(s), beam management reference signal(s), and the like. The base station 305 may transmit the timing synchronization signals over-the-air to some or all of the UEs operating within its coverage area, such as UE 310.

UE 310 may be configured with two (or more) interfaces, where each interface provides a mechanism for the UE 310 to communicate using a distinct protocol, language, medium, and the like. For example, UE 310 may include a cellular interface 320 and a local wired interface 325. The cellular interface 320 may provide wireless communication functionality for UE 310, which may support wireless communications between base station 305 and UE 310. Thus, UE 310 may receive the timing synchronization signals from base station 305 over the cellular wireless communication link using cellular interface 320.

In some aspects, local wired interface 325 may provide direct communication functionality over a hard-wired connection between end device 315. For example, the local wired interface 325 may support UE 310 communications with end device 315 using various protocols, e.g., machine language, IP traffic, or any other language protocol. In some examples, UE 310 is integrated into end device 315, or vice versa, such that the local wired interface 325 may be a serial or parallel interface.

In some aspects, local wired interface 325 may include a timer function (e.g., one or more clocks, counters, and the like) that UE 310 configures based on the timing synchronization signal(s) received from base station 305. For example, UE 310 may use the timing information in the timing synchronization signals to set an operational clock, to establish a relative clock, etc. UE 310 may transmit the timing control signals to the device 315 using the local wired interface 325 and based on the timer function.

In some aspects, this may include UE 310 controlling or otherwise managing aspect(s) of end device 315. As one example, the timing control signals may provide operational control for various mechanisms of end device 315 that require synchronized timing, movement, etc. In one non-limiting example, the UE 310 may configure a PTP function as the timer function and use PTP commands to transmit the timing control signals to the end device 315.

In some aspects, UE 310 may receive multiple instances of a signal from the base station 305. In the example of FIG. 3, the UE may receive a first LOS instance 330 of a signal. The first LOS instance 330 of the signal may be an earliest received instance of the signal at the UE 310, as it is the shortest distance path between the base station 305 and the UE 310. The UE 310 may also receive a second non-LOS instance 335 of the signal, and a third non-LOS instance 340 of the signal. The second non-LOS instance 335 and the third non-LOS instance 340 may have a later arrival time at the UE 310 than the first LOS instance 330 of the signal. However, the second non-LOS instance 335 and the third non-LOS instance 340 of the signal may have a relatively close arrival time at the UE 310 (e.g., due to similar path lengths) and a peak energy of the signal as received at the UE 310 may be after the arrival time of the earliest received first LOS instance 330 of the signal.

As discussed above, the UE 310 may determine cellular frame boundary timing using synchronization signals (PSS/SSS) and PRS (Positioning Reference Signal) based on a time at which the peak energy of the signal is received at the UE 310. For example, the UE 310 may combine estimates of SFN boundary time, and one or more pieces of system information provided by the base station 305 (e.g., via system information block (SIB) transmissions, such as SIB 16 or SIB 8) to time synchronize with the cellular network. However, such techniques may not account for propagation delay. For example, if the UE 310 is 600 meters away from the base station 305, a 2 microsecond propagation delay would be expected for the first LOS instance 330 of the signal. In some cases, the base station 305 and UE 310 may determine timing advance (TA) information, but such information may be based on peak energy detection of signals, and reporting granularity may exceed time synchronization requirements for end device 315.

In some cases, the UE 310 may determine synchronization for wireless transmissions based on established frame boundary identification based on the maximum energy path (s) of received signals, which may be used to determine one or more events at which a time is known. For example, a sounding reference signal (SRS) may be transmitted by the UE 310 at a known time within a subframe, and the base station 305 may identify a time at which a first instance of the SRS is received to determine the propagation delay between the UE 310 and the base station 305. The base station 305 may start a downlink transmission based on the time of arrival of the first instance or the maximum energy time of arrival of the signal. Similarly, the UE 310 may know a time within a subframe at which the base station 305 will transmit a signal (e.g., PSS/SSS) and determine the propagation delay based on a first instance of the received signal. The UE 310 may start uplink transmission based on the time of arrival of the first LOS instance 330 or the maximum energy time of arrival. Time adjustment based on the maximum energy time of arrival may provide that most of the received energy is within the cyclic prefix duration of the transmitted signal, while timing adjustment based on the first arrival time may compensate for propagation time, and the UE 310 or base station 305 may, in some cases, select the timing adjustment based on the type of communication.

In some cases, the base station 305 may transmit a first timing advance command for TA determinations based on frame/subframe boundaries and peak received energy, and a second timing advance command may be provided for timing advance determinations based on a first received instance of a signal for the purpose of time-synchronization. In some examples, the UE 310 or base station 305 may measure the time of first arrival of a first signal transmitted from the other node, modify the time at which a second signal is transmitted based on the measured time of first arrival, and report the time difference between the first arrival time and the local time corresponding to that signal. In some cases, the base station 305 may transmit, via radio resource control (RRC) signaling, a second timing advance command, and the UE 310 may report the time difference associated with the propagation delay of the first LOS instance 330 of a received signal. In another example, the UE 310 may be configured to transmit a SRS at an established local time ($t_1$) according to the UE 310 clock, which may be synchronized with a clock at the base station 305. The base station 305 may measure a first arrival time of the SRS ($t_2$), and may compute the difference ($t_1-t_2$) to determine the propagation delay. The UE 310 may perform similar measurements and calculations. The time difference may be reported to the other node, and used for timing control for end device 315. In some cases, the base station 305 may transmit a time synchronized command that is to be received at the UE 310. The base station, in such cases, may transmit the command at a time equal to the propagation delay that is in advance of the time that the synchronized command is to be received at the UE 310. In some cases, a time offset may be applied to the timer function that is based on the difference ($t_1-t_2$).

Figure 3B:
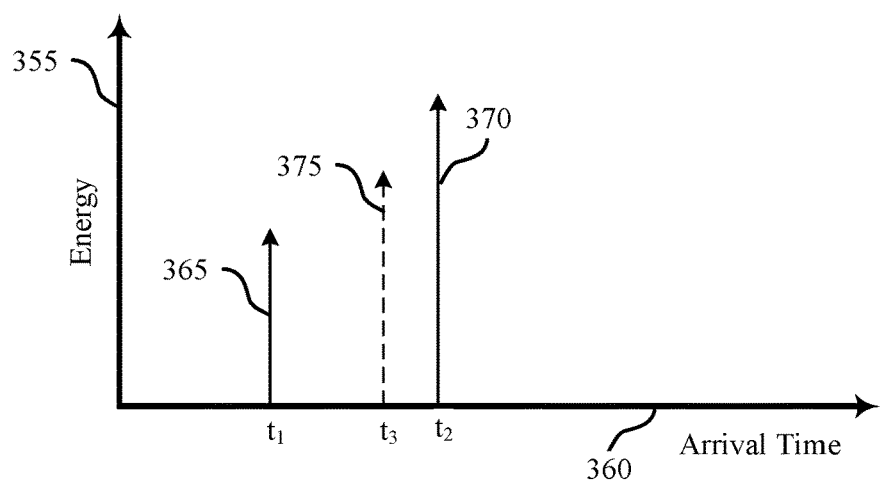
FIG. 3B illustrates an example of arrival times for different signal paths in a system that supports time synchronization techniques for wireless communications in accordance with aspects of the present disclosure.

FIG. 3B illustrates an example of arrival times 350 for different signal paths in a system that supports time synchronization techniques for wireless communications in accordance with aspects of the present disclosure. In some examples, arrival times 350 may be arrival times of signals received at a UE or at a base station of wireless communications system 100, 200, or 300. In this example, a instances of received transmissions may have an associated energy 355 that is received at an arrival time 360. A first instance 365 of a received transmission, which may be received at time $t_1$, may be from a LOS transmission path (e.g., an energy from the first LOS instance 330). A peak energy instance 370 of the received transmission may have an aggregate energy that is greater than the energy of the first instance 365 (e.g., an aggregate energy of the second non-LOS instance 335 and the third non-LOS instance 340) and have a reception time of $t_2$. In some cases, a UE or a base station may detect an average energy 375 of detected instances of the received transmission which may be assigned an arrival time $t_3$, which may be a weighted average time at which different instances of the received signal arrive, and which may be used for frame boundary synchronization. In the example of FIG. 3B, the average energy path 375 and $t_3$ is between the first instance 365 and the peak energy instance 370, and biased towards the peak energy instance 370 because of the higher energy of the peak energy instance 370.

Figure 4:
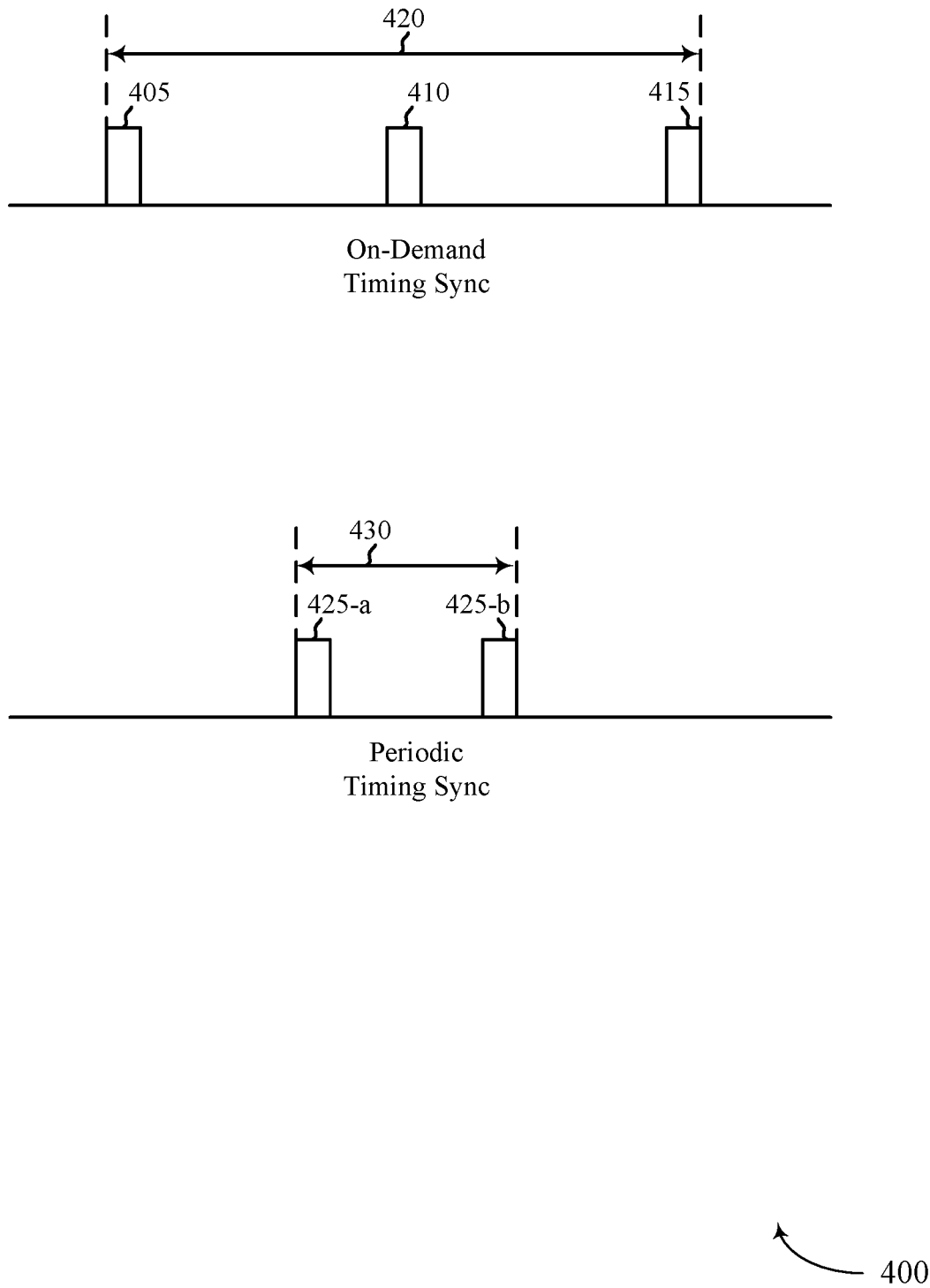
FIG. 4 illustrates an example of a timing diagram that supports modifying signaling periodicity for time synchronization in accordance with aspects of the present disclosure.

FIG. 4 illustrates an example of a timing diagram 400 that supports modifying signaling periodicity for time synchronization in accordance with various aspects of the present disclosure. In some examples, timing diagram 400 may implement aspects of wireless communications systems 100 or 200. Aspects of timing diagram 400 may be implemented by a UE and/or a base station, which may be examples of the corresponding devices described herein.

Generally, timing diagram 400 illustrates an on-demand timing synchronization timeline and a periodic timing synchronization timeline. The on-demand timing synchronization timeline may generally refer to the conventional technique utilized in a cellular network for timing synchronization (or update) at the UE. Initially, the base station may transmit a request signal 405 that triggers or initiates the timing synchronization (or update) procedure. The request signal 405 may be a unicast transmission for a particular UE and/or may be a broadcast transmission for any UE whose timing synchronization is to be updated. The UE(s) may receive the request message 405 and begin locating timing synchronization signal(s) on which to perform timing measurements. The timing synchronization signal(s) may include any combination of reference signals, synchronization signals, beam management signals, and the like. The UE may respond by transmitting a timing measurement report signal 410 to the base station. The timing measurement report signal 410 may include timing measurement information determined based on the timing measurement(s) performed by the UE. The bases station may receive the timing measurement report signal 410 and calculate a timing advance parameter for the UE. The timing advance parameter may generally indicate the amount of time that the UE is to advance or slow its transmissions in order to achieve frame boundary alignment. The base station may transmit a timing advance command 415 to the UE to synchronize (or update) the timing of the UE.

In some aspects, the described on-demand timing synchronization procedure has an associated latency identified as delay period 420. The delay period 420 may cover the time period that it takes for the transmission and reception of the request signal 405, for the UE to perform the timing measurements and transmit the timing measurement report signal 410, and for the base station to calculate and transmit the timing advance command 415 back to the UE. What is not shown in delay period 420 is the time it takes for the base station to determine that the timing synchronization (or update) procedure needs to be triggered and the time it takes for the base station to then identify, schedule, and communicate an indication of the resources that are used for the timing measurement report signal 410 and the timing advance command 415. Cumulatively, the complete time delay for a traditional on-demand timing advance command may be extensive. In some aspects, this extensive delay may limit the degree of timing accuracy that the UE can achieve, which may not support the UE operating within a timing accuracy threshold.

Accordingly, the periodic timing synchronization timeline may be utilized in accordance with aspects discussed herein. In some cases, the base station may determine that the UE is operating within a timing accuracy threshold. The timing accuracy threshold may refer to the degree of timing accuracy that the UE must maintain. In some aspects, the timing accuracy threshold may be more stringent than the frame boundary alignment goal of the conventional on-demand timing synchronization techniques described above.

The base station may schedule periodic resources 425 that are to be used for timing synchronization performed between the base station and UE. The periodic resources 425 may be used for timing control signals, such as timing measurement signals transmitted from the UE to the base station, timing advance commands transmitted from the base station to the UE, and the like. In one example, resource 425-*a* may be used for transmission of a timing measurement report (or signal) and resource 425-*b* may be used for the timing advance command. In another example, resource 425-*a* may be used for a timing advance command and resource 425-*b* may be used for a timing measurement report (or signal). If the periodic resources 425 are sufficient, each of periodic resources 425-1 and 425-*b* may be used for both a timing measurement report (or signal) and a timing advance command. The base station scheduling the periodic resources 425 may provide a mechanism where the UE and base station automatically and continuously communicate the timing measurement reports/timing advance commands, e.g., without such transmissions being triggered by a request message, such as request signal 405. This may reduce the latency of the timing synchronization (or update) procedure and provide a mechanism where the UE can achieve/maintain a degree of timing accuracy that satisfies the timing accuracy threshold.

In some aspects, the periodic timing synchronization procedure may have a periodicity 430 that covers the time period between subsequent instances of periodic resources 425. The base station may select (or adjust) the periodicity 430 based on the timing accuracy threshold that the UE is operating within, as well as network conditions. This may support even more precise timing accuracy levels at the UE.

Figure 5:
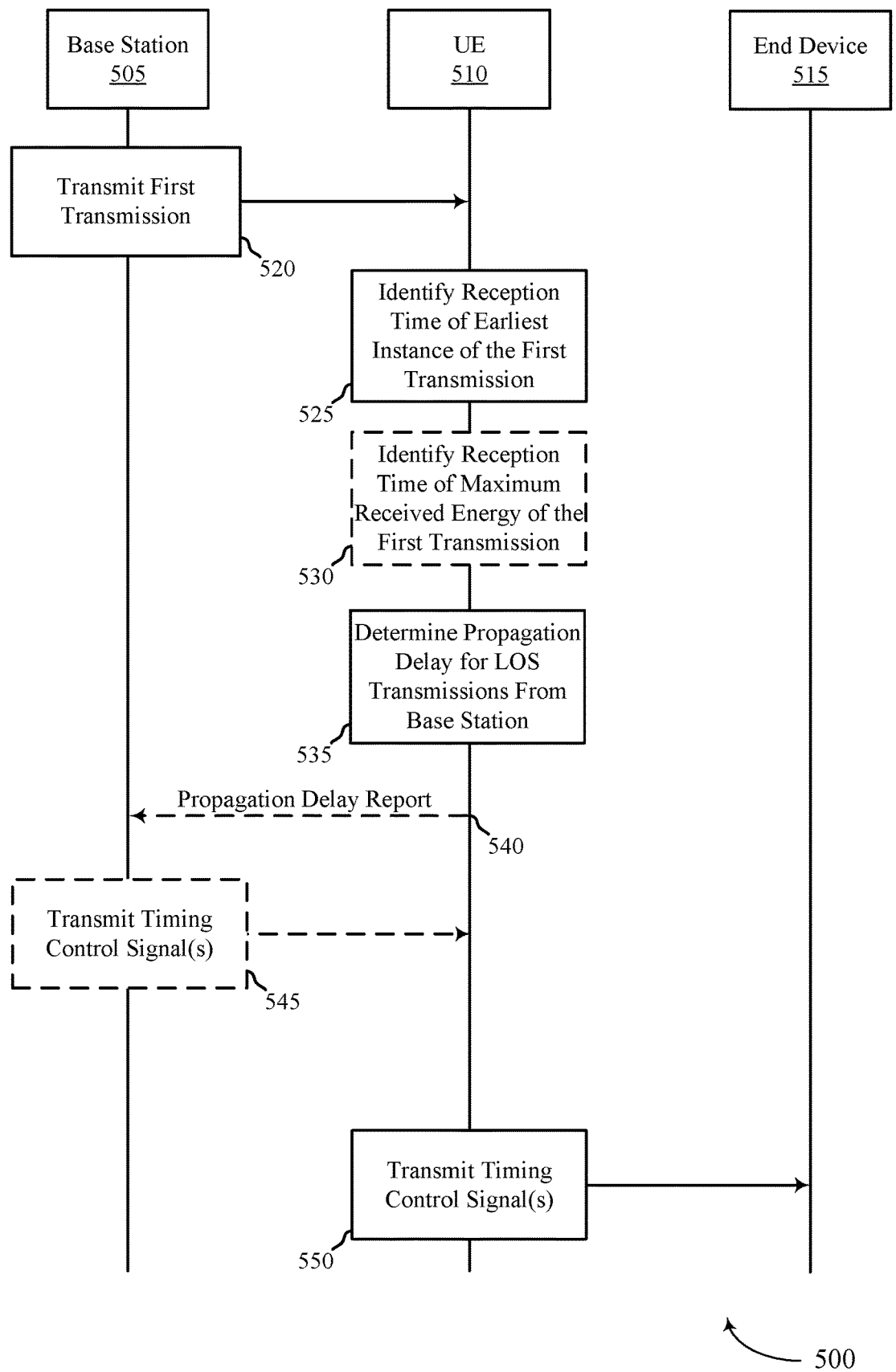
FIG. 5 illustrates an example of a process flow that supports time synchronization techniques for wireless communications in accordance with aspects of the present disclosure.

FIG. 5 illustrates an example of a process flow 500 that supports time synchronization techniques for wireless communications in accordance with various aspects of the present disclosure. In some examples, process flow 500 may implement aspects of wireless communications system 100, 200, or 300. Process flow 500 may include a base station 505, a UE 510, and a device 515, which may be examples of the corresponding devices described herein. In some aspects, device 515 is an end device connected to a local wired interface and controlled by UE 510.

At 520, base station 505 may transmit (and UE 510 may receive) a first transmission over a cellular wireless communication link. In some cases, the first transmission may include any combination of a PSS, SSS, SIB, PRS, and the like.

At 525, UE 510 may identify a reception time of an earliest instance of the first transmission. As indicated above, the reception time of the earliest instance of the first transmission may correspond to a LOS path of the first transmission that may be used to determine a propagation delay between the base station 505 and the UE 510.

At optional block 530, the UE 510 may identify a reception time of a maximum received energy of the first transmission. In some cases, the reception time of the maximum received energy of the first transmission may be used for frame boundary synchronization. In some cases, the UE 510 may identify that the first transmission is received based on the maximum received energy of the first transmission, and then identify the first received instance of the first transmission to determine the corresponding reception time. For example, the UE 510 may buffer signals received when an expected synchronization signal is transmitted from the base station 505, and perform signal processing on the buffered signals to identify the first transmission, the first reception time, and a maximum received energy reception time. In some cases, the UE 510 may measure reception times of each of the earliest instance of the first transmission and the time of maximum received energy of the first transmission. In other cases, the UE 510 may determine the reception time of the earliest instance of the first transmission based on a cyclic prefix of the first transmission (e.g., based on a relative starting location of a bit sequence of the first transmission within the cyclic prefix).

At 535, the UE 510 may determine a propagation delay for a LOS transmission from the base station 505. As discussed above, the propagation delay may be determined based on the reception time of the earliest instance of the received first transmission. In some cases, UE 510 may transmit optional propagation delay report 540 to the base station 505.

Optionally, at 545, the base station 505 may transmit one or more timing control signals to the UE 510. The timing of the timing control signals may be based on an identified propagation delay for signals transmitted between the base station 505 and the UE 510, in accordance with various aspects as discussed herein. The UE 510 may receive the timing control signal(s) and perform one or more synchronized tasks based on the timing control signal(s). In some cases, the UE 510 may have a timer function that may be used for time synchronized commands and transmissions between the UE 510, base station 505, and device 515. In some cases, the timing control signal(s) from the base station 505 may be used for synchronization of the timer function. In some cases, a difference between the earliest instance of the first transmission and the time of maximum received energy may be applied as part of a time offset of the timer function.

At 550, the UE 510 may transmit (and device 515 may receive) timing control signals via the local wired interface. The timing control signals may be based on the timer function.

Figure 6:
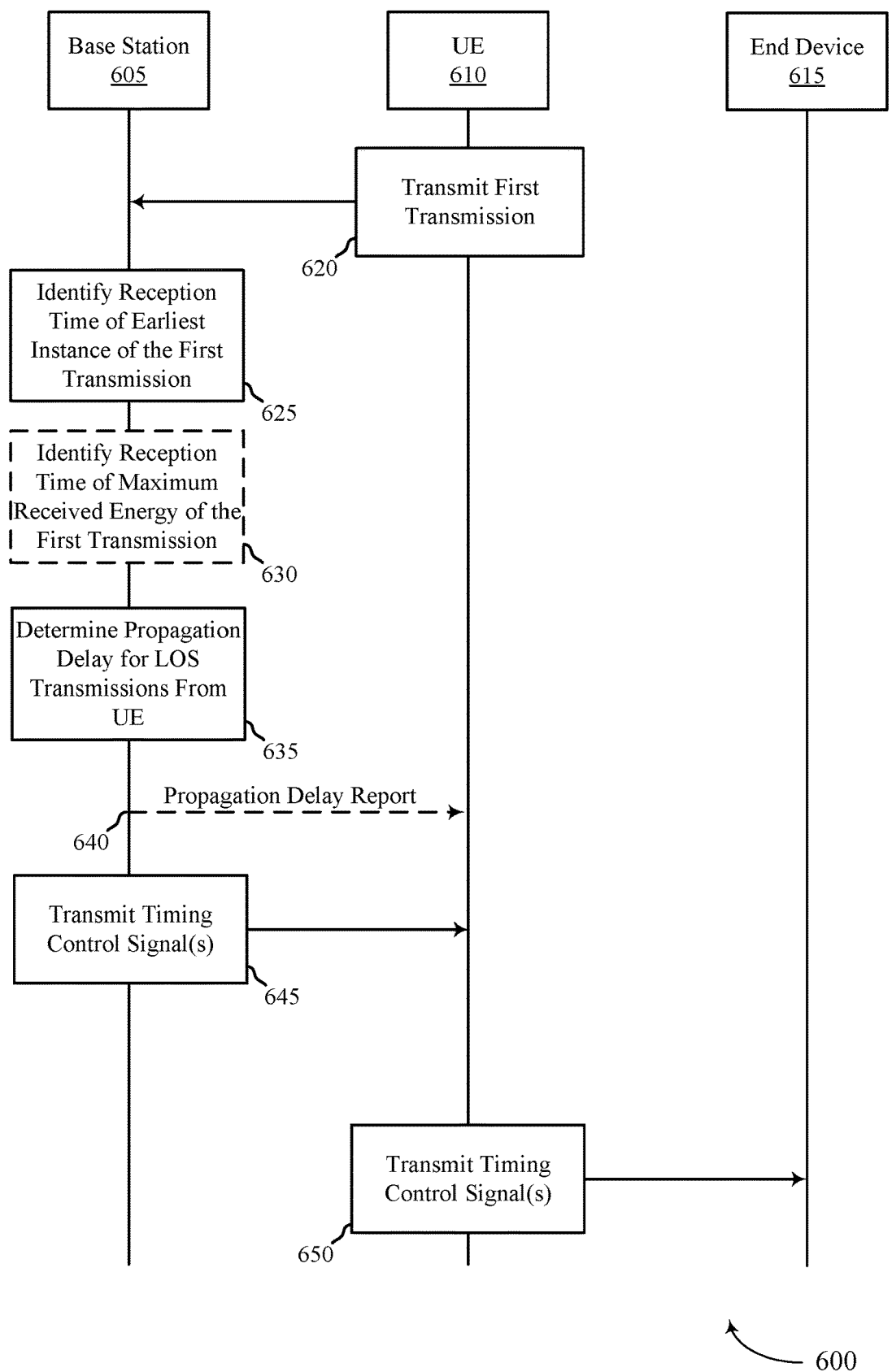
FIG. 6 illustrates an example of another process flow that supports time synchronization techniques for wireless communications in accordance with aspects of the present disclosure.

FIG. 6 illustrates an example of a process flow 600 that supports time synchronization techniques for wireless communications in accordance with various aspects of the present disclosure. In some examples, process flow 600 may implement aspects of wireless communications system 100, 200, or 300. Process flow 600 may include a base station 605, a UE 610, and a device 615, which may be examples of the corresponding devices described herein. In some aspects, device 615 is an end device connected to a local wired interface and controlled by UE 610. In some cases, the process flow 500 of FIG. 5 may be performed before the process flow of FIG. 6.

At 620, UE 610 may transmit (and base station 605 may receive) a first transmission over a cellular wireless communication link. In some cases, the first transmission may include a reference signal transmission from the UE 610 (e.g., a SRS transmission). In some cases, the transmission time of the first signal may depend on the results of 525 and 530 of FIG. 5. For example, at 525 the UE may determine the reception time of the earliest path is at time $t_1$ and at 530 the UE may determine that the reception time of maximum received energy is at time $t_2$. In such a case, at 620 the UE 610 may transmit two signals, in which a first transmission time depends on $t_1$ and the second transmission time depends on $t_2$.

At 625, base station 605 may identify a reception time of an earliest instance of the first transmission. As indicated above, the reception time of the earliest instance of the first transmission may correspond to a LOS path of the first transmission that may be used to determine a propagation delay between the base station 605 and the UE 610. In cases where the UE 610 transmits two signals, the base station 605 may receive the first signal and determine the reception time of the earliest path of the first signal, and sends a first timing control signal (at 645) based on the earliest path of the first signal, and may determine (at 630) the reception time of the maximum energy path of the second signal.

Optionally, at 630, the base station 605 may identify a reception time of a maximum received energy of the first transmission. In some cases, the reception time of the maximum received energy of the first transmission may be used for frame boundary synchronization. In some cases, the base station 605 may identify that the first transmission is received based on the maximum received energy of the first transmission, and then identify the first received instance of the first transmission to determine the corresponding reception time. For example, the base station 605 may buffer signals received when an expected synchronization signal is transmitted from the UE 610, and perform signal processing on the buffered signals to identify the first transmission, the first reception time, and a maximum received energy reception time. As indicated above, in cases where the UE transmits a first signal and a second signal, the first signal may be used for timing control signal transmissions, and the second signal may be used for frame boundary synchronization.

At 635, the base station 605 may determine a propagation delay for a LOS transmission from the UE 610. As discussed above, the propagation delay may be determined based on the reception time of the earliest instance of the received first transmission. In some cases, base station 605 may transmit optional propagation delay report 640 to the UE 610.

At 645, the base station 605 may transmit one or more timing control signals to the UE 610. The timing of the timing control signals may be based on an identified propagation delay for signals transmitted between the base station 605 and the UE 610, in accordance with various aspects as discussed herein. The UE 610 may receive the timing control signal(s) and perform one or more synchronized tasks based on the timing control signal(s). In some cases, the UE 610 may have a timer function that may be used for time synchronized commands and transmissions between the UE 610, base station 605, and device 615. In some cases, the timing control signal(s) from the base station 605 may be used for synchronization of the timer function. In some cases, the base station 605 may transmit a first time control signal for the one or more synchronized tasks of device 615, and may transmit a second time control signal to that the UE 610 may use to determine its uplink signal transmission time for communicating with the base station (e.g., for LTE or NR transmissions between the base station 605 and the UE 610).

At 650, the UE 610 may transmit (and device 615 may receive) timing control signals via the local wired interface. The timing control signals may be based on the timer function.

Figure 7:
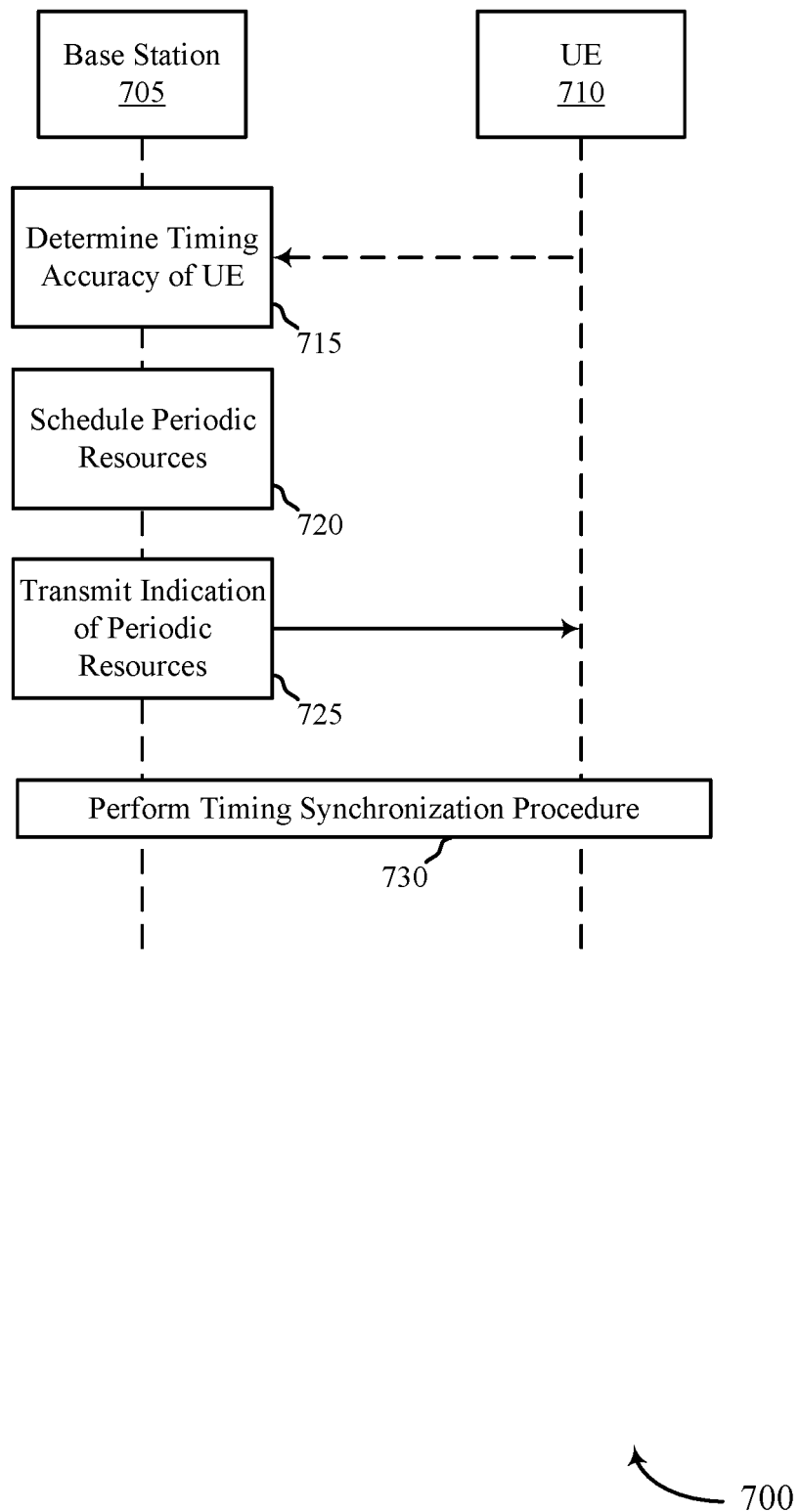
FIG. 7 illustrates an example of another process flow that supports time synchronization techniques for wireless communications in accordance with aspects of the present disclosure.

FIG. 7 illustrates an example of a process 700 that supports modifying signaling periodicity for time synchronization in accordance with various aspects of the present disclosure. In some examples, process 700 may implement aspects of wireless communications systems 100 or 200. Process 700 may include a base station 705 and a UE 710, which may be examples of the corresponding devices described herein.

At 715, base station 705 may determine that UE 710 is operating within a timing accuracy threshold. In one example (as indicated by the dashed line), base station 705 may determine that UE 710 is operating within the timing accuracy threshold based on a signal received from UE 710. In another example (not shown), base station 705 may determine that UE 710 is operating within the timing accuracy threshold based on information received from another source, such as a network entity. In some aspects, base station 705 may determine that UE 710 is operating within the timing accuracy threshold based on the UE-type of UE 710, based on a data type that UE 710 is communicating, and/or based on an explicit signaling that UE 710 is operating in the timing accuracy threshold.

At 720, base station 705 may schedule periodic resources for a timing synchronization (or update) procedure to be performed with UE 710. The periodic resources may have a periodicity that is based at least in part on the timing accuracy threshold that UE 710 is operating within. A higher periodicity (e.g., shorter period) may support finer timing synchronization whereas a lower periodicity (e.g., longer period) may support less stringent timing synchronization. The periodic resources may be resources that are used for communicating signal(s) with the UE 710 that are transmitted during the timing synchronization procedure. For example, the periodic resources may be used for transmitting timing measurement reports (or signals), timing advance commands, and the like, during the timing synchronization procedure.

At 725, base station 705 may transmit (and UE 710 may receive) an indication of the scheduled periodic resources. The indication may be carried or otherwise conveyed in a grant, a configuration message, and the like.

At 730, base station 705 and UE 710 may perform a timing synchronization procedure using the periodic resources. This may include the base station 705 and UE 710 communicating the timing measurement report signals, timing advance commands, automatically and continuously using the scheduled resources.

In some aspects, the channel performance of the cellular link between base station 705 and UE 710 may be determined suitable to support the periodic timing synchronization techniques. For example, base station 705 may determine that at least one metric of the cellular wireless communication link between the base station 705 and the UE 710 satisfies a threshold and, if so, schedule the periodic resources for the timing synchronization procedure based at least in part on the determination. Examples of the metric(s) may include any combination of a RSRP, a SNR, a SINR, a RSRQ, a bandwidth parameter, a throughput parameter, and the like.

Figure 8:
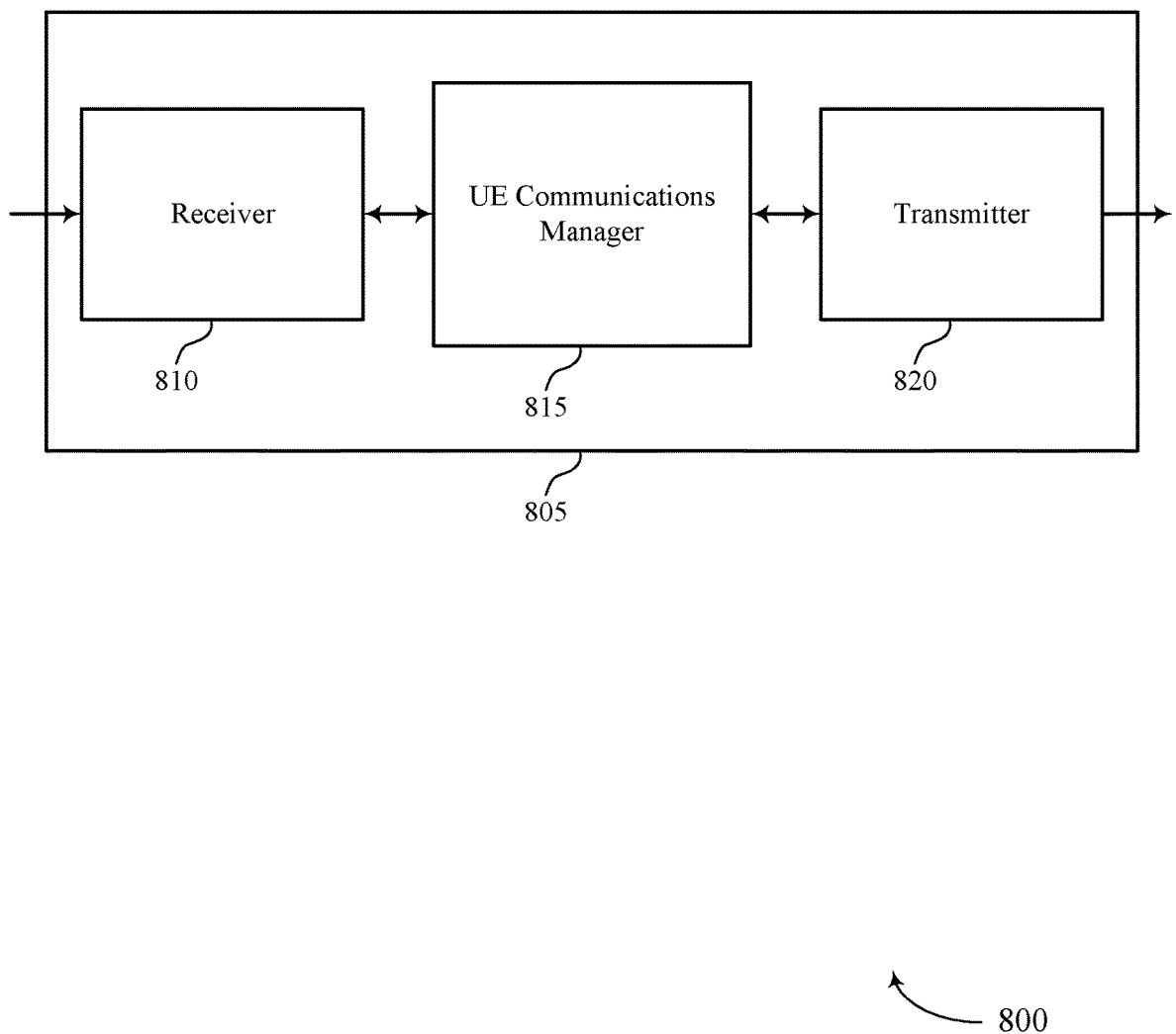
FIGS. 8 through 10 show block diagrams of a device that supports time synchronization techniques for wireless communications in accordance with aspects of the present disclosure.

FIG. 8 shows a block diagram 800 of a wireless device 805 that supports time synchronization techniques for wireless communications in accordance with aspects of the present disclosure. Wireless device 805 may be an example of aspects of a user equipment (UE) as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to time synchronization techniques for wireless communications, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive, at a set of times, a corresponding set of instances of a first signal from a base station, identify a first reception time corresponding to an earliest instance of the first signal being received at the UE, the first reception time being in advance of a second reception time corresponding to one or more later instances of the first signal being received at the UE, an aggregate energy level of the one or more later instances of the first signal being higher than an energy level of the earliest instance of the first signal being received at the UE, determine a time difference between the first reception time and the second reception time, and report the time difference to the base station.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
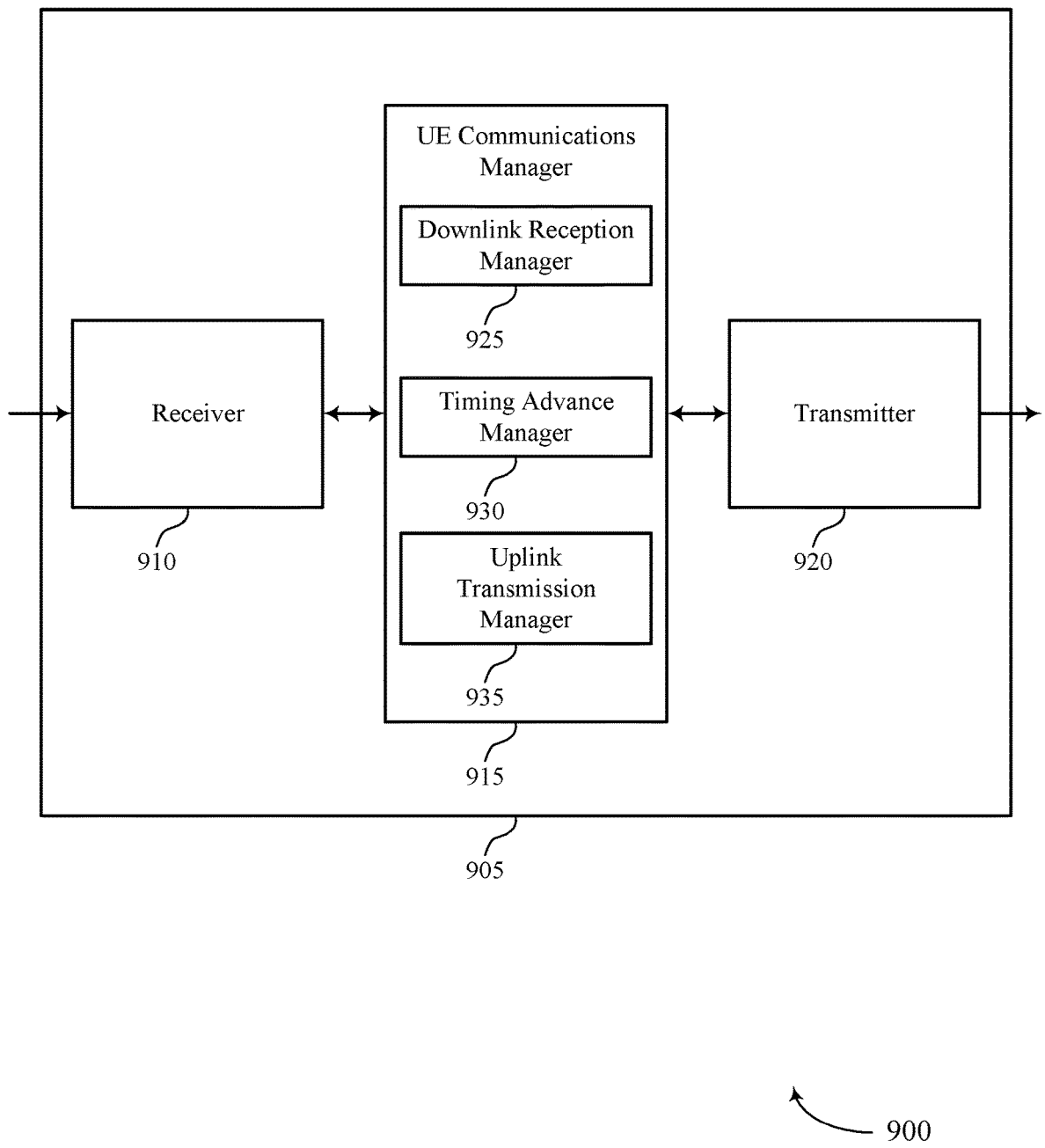

FIG. 9 shows a block diagram 900 of a wireless device 905 that supports time synchronization techniques for wireless communications in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to time synchronization techniques for wireless communications, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include downlink reception manager 925, timing advance manager 930, and uplink transmission manager 935.

Downlink reception manager 925 may receive, at the UE and at a set of times, a corresponding set of instances of a first signal from a base station. In some cases, the first signal includes at least one of: a primary synchronization signal, a secondary synchronization signal, a system information block, a sounding reference signal, a positioning reference signal, or any combination thereof.

Timing advance manager 930 may identify a first reception time corresponding to an earliest instance of the first signal being received at the UE, the first reception time being in advance of a second reception time corresponding to one or more later instances of the first signal being received at the UE, an aggregate energy level of the one or more later instances of the first signal being higher than an energy level of the earliest instance of the first signal being received at the UE. In some cases, timing advance manager 930 may report a first timing advance and a second timing advance to the base station, the first timing advance associated with a frame boundary for communications with the base station, and the second timing advance associated with a time of reception of the earliest instance of the first signal. In some cases, timing advance manager 930 may report a difference between the first reception time and the second reception time to the base station via the second signal.

In some cases, the first signal includes an indication that a first timing advance and a second timing advance are to be identified, the first timing advance corresponding to a first propagation delay between when the base station transmits the first signal and the second reception time, and the second timing advance corresponding to a second propagation delay between when the base station transmits the first signal and the first reception time. In some cases, the first propagation delay corresponds to one or more non-line-of-sight paths of the first signal between the base station and the UE, and the second propagation delay corresponds to a line-of-sight path between the base station and the UE. In some cases, the first timing advance corresponds to a first time adjustment that provides that a majority of received energy for transmissions between the UE and the base station is within a cyclic prefix duration configured for transmission between the UE and the base station, and the second timing advance corresponds to a second time adjustment that compensates for the second propagation delay.

Uplink transmission manager 935 may transmit a second signal to the base station at a second signal transmission time, the second signal transmission time based on the first reception time.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
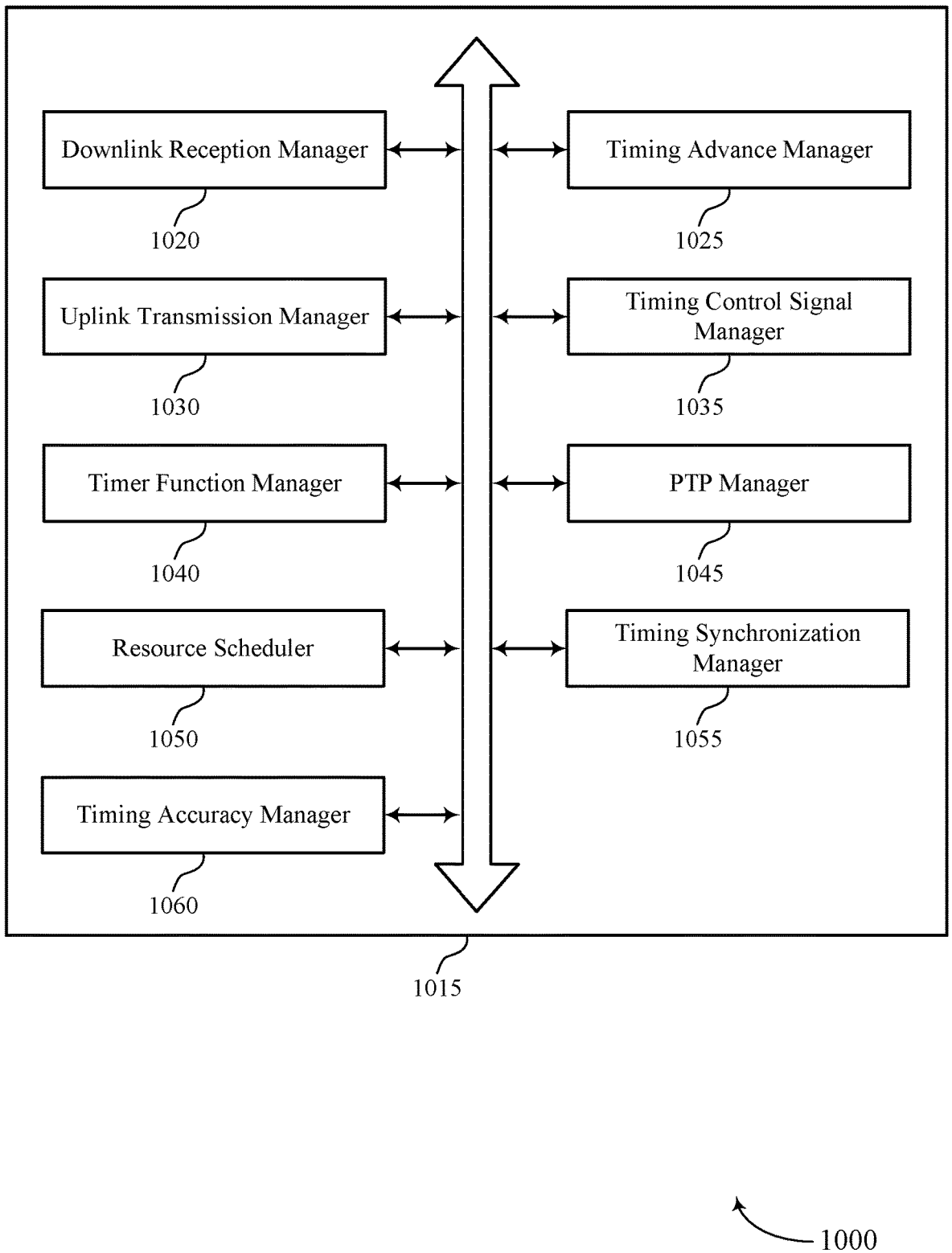

FIG. 10 shows a block diagram 1000 of a UE communications manager 1015 that supports time synchronization techniques for wireless communications in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include downlink reception manager 1020, timing advance manager 1025, uplink transmission manager 1030, timing control signal manager 1035, timer function manager 1040, PTP manager 1045, resource scheduler 1050, timing synchronization manager 1055, and timing accuracy manager 1060. Each of these modules may communicate, directly or indirectly, with one another (e.g., via one or more buses).

Downlink reception manager 1020 may receive, at a set of times, a corresponding set of instances of a first signal from a base station. In some cases, the first signal includes at least one of a primary synchronization signal, a secondary synchronization signal, a system information block, a sounding reference signal, a positioning reference signal, or any combination thereof.

Timing advance manager 1025 may identify a first reception time corresponding to an earliest instance of the first signal being received at the UE, the first reception time being in advance of a second reception time corresponding to one or more later instances of the first signal being received at the UE, an aggregate energy level of the one or more later instances of the first signal being higher than an energy level of the earliest instance of the first signal being received at the UE. In some cases, timing advance manager 1025 may report a first timing advance and a second timing advance to the base station, the first timing advance associated with a frame boundary for communications with the base station, and the second timing advance associated with a time of reception of the earliest instance of the first signal. In some cases, timing advance manager 1025 may report a difference between the first reception time and the second reception time to the base station via the second signal.

In some cases, the first signal includes an indication that a first timing advance and a second timing advance are to be identified, the first timing advance corresponding to a first propagation delay between when the base station transmits the first signal and the second reception time, and the second timing advance corresponding to a second propagation delay between when the base station transmits the first signal and the first reception time. In some cases, the first propagation delay corresponds to one or more non-line-of-sight paths of the first signal between the base station and the UE, and the second propagation delay corresponds to a line-of-sight path between the base station and the UE. In some cases, the first timing advance corresponds to a first time adjustment that provides that a majority of received energy for transmissions between the UE and the base station is within a cyclic prefix duration configured for transmission between the UE and the base station, and the second timing advance corresponds to a second time adjustment that compensates for the second propagation delay.

Uplink transmission manager 1030 may transmit a second signal to the base station at a second signal transmission time, the second signal transmission time based on the first reception time.

Timing control signal manager 1035 may transmit a third signal to a device coupled with the UE, a timing of the third signal based on the first reception time. In some cases, timing control signal manager 1035 may provide a timing control signal to the device connected to the UE via a local wired interface, where the timing control signal is based on a timer function.

Timer function manager 1040 may configure a timer function of a local wired interface of the UE based on the first reception time. PTP manager 1045 may perform timing synchronization tasks. In some cases, the timer function is a precision timing protocol (PTP) function. In some cases, the device is an end device connected to the local wired interface and controlled by the UE.

Resource scheduler 1050 may receive a configuration signal identifying periodic resources scheduled for a timing synchronization procedure to be performed with the base station, the periodic resources having a periodicity based on a timing accuracy threshold by which the UE is to operate. In some cases, the periodic resources are used for at least one of: transmission of a time synchronization measurement to the base station, reception of a timing advance command from the base station, or combinations thereof. In some cases, the periodicity of the periodic resources is further based on a RSRP, a SNR, a SINR, a RSRQ, a bandwidth parameter, a throughput parameter, or a combination thereof.

Timing synchronization manager 1055 may perform the timing synchronization procedure with the base station according to the periodicity and using the periodic resources and communicate one or more signals with the base station that are transmitted using the periodic resources during the timing synchronization procedure.

Timing accuracy manager 1060 may transmit an indication to the base station that the UE is to operate within the timing accuracy threshold and transmit the indication includes at least one of: communicating a defined data type, communicating an indication that the UE is a defined UE type, transmitting a signal to the base station conveying the indication, or a combination thereof.

Figure 11:
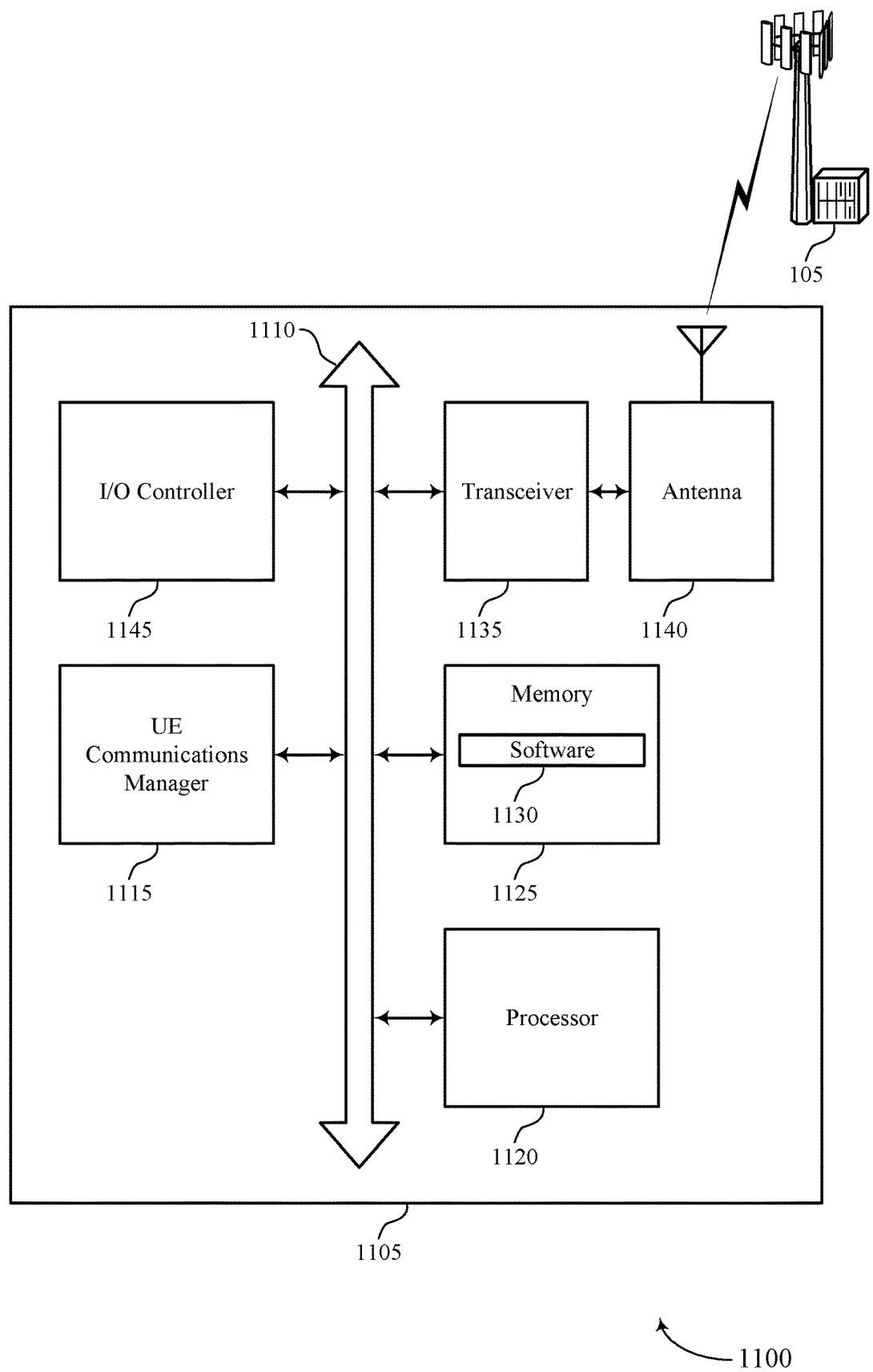
FIG. 11 illustrates a block diagram of a system including a UE that supports time synchronization techniques for wireless communications in accordance with aspects of the present disclosure.

FIG. 11 shows a diagram of a system 1100 including a device 1105 that supports time synchronization techniques for wireless communications in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting time synchronization techniques for wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support time synchronization techniques for wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
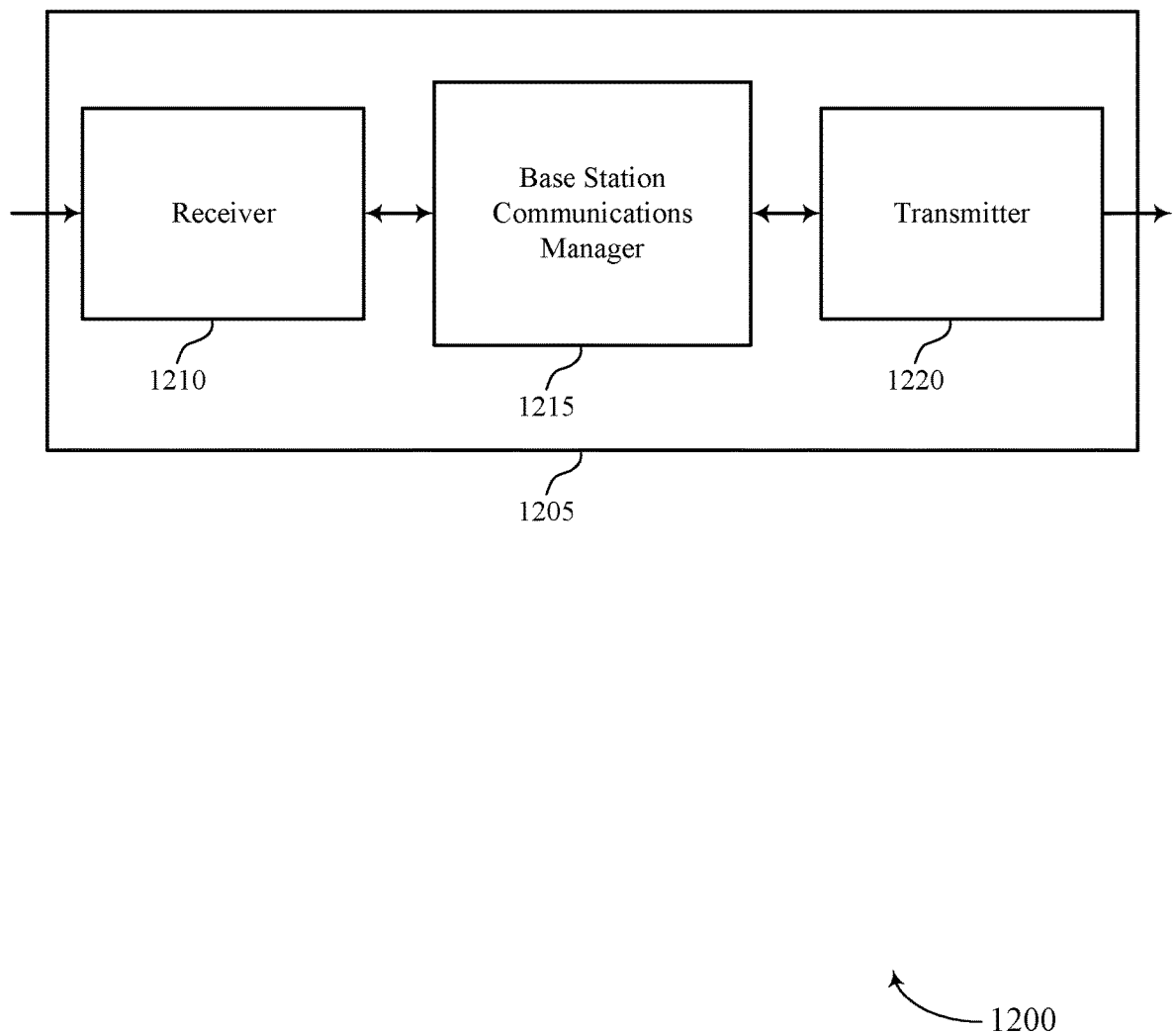
FIGS. 12 through 14 show block diagrams of a device that supports time synchronization techniques for wireless communications in accordance with aspects of the present disclosure.

FIG. 12 shows a block diagram 1200 of a wireless device 1205 that supports time synchronization techniques for wireless communications in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to time synchronization techniques for wireless communications, etc.). Information may be passed on to other components of the device. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may transmit a first signal to a UE, receive, from the UE, an indication of a time difference between a first reception time and a second reception time of the first signal at the UE, where the first reception time corresponds to an earliest instance of the first signal being received at the UE, and the second reception time corresponds to one or more later instances of the first signal being received at the UE, and adjust a time offset associated with the UE based at least in part on the indication of the time difference.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
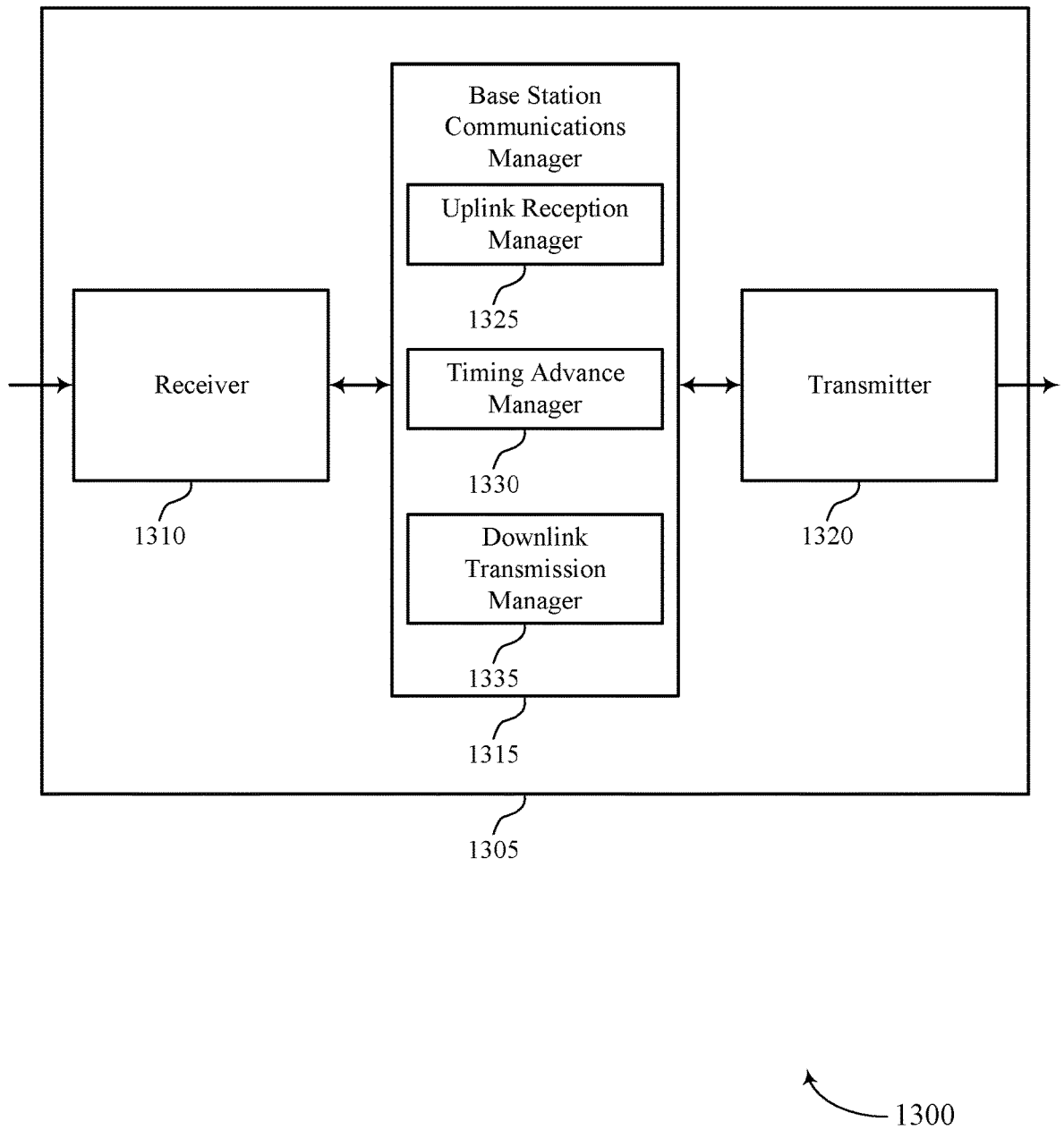

FIG. 13 shows a block diagram 1300 of a wireless device 1305 that supports time synchronization techniques for wireless communications in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to time synchronization techniques for wireless communications, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include uplink reception manager 1325, timing advance manager 1330, and downlink transmission manager 1335.

Uplink reception manager 1325 may receive uplink communications from a UE. In some cases, uplink reception manager 1325 may receive an indication of a time difference between a first reception time and a second reception time of the first signal at the UE. In some cases, the first reception time corresponds to an earliest instance of the first signal being received at the UE, and the second reception time corresponds to one or more later instances of the first signal being received at the UE.

Timing advance manager 1330 may adjust a time offset associated with the UE based at least in part on the indication of the time difference. In some cases, timing advance manager 1330 may determine a difference between the first reception time and the second reception time, and report the timing advance to the UE. In some cases, the propagation delay corresponds to a line-of-sight path of the first signal between the UE and the base station, and the second reception time is associated with one or more non-line-of-sight paths between the UE and the base station. In some cases, the timing advance corresponds to a time adjustment that used to determine the second signal transmission time.

Downlink transmission manager 1335 may transmit the first signal to the UE, and may transmit one or more other downlink transmissions to the UE.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
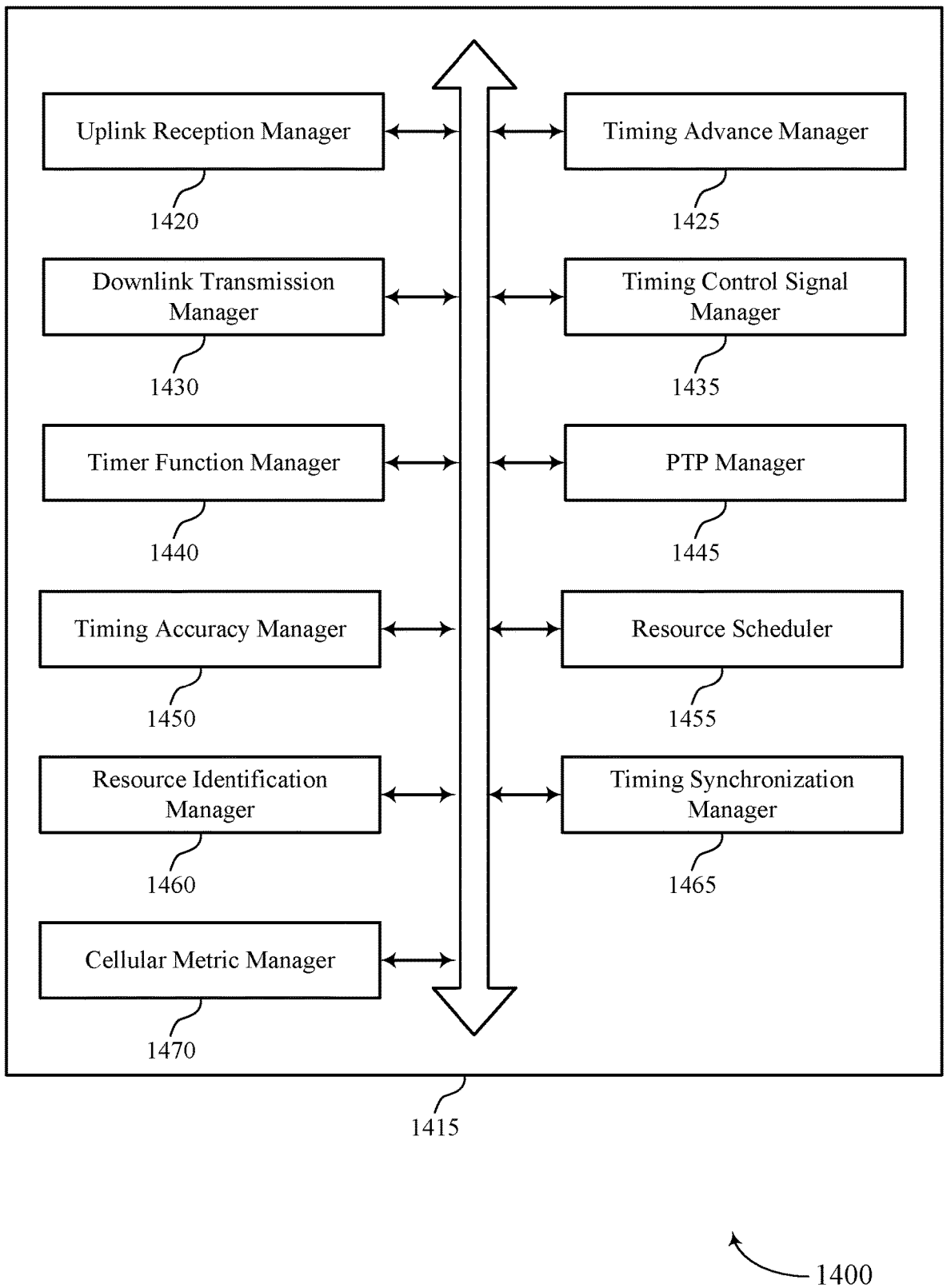

FIG. 14 shows a block diagram 1400 of a base station communications manager 1415 that supports time synchronization techniques for wireless communications in accordance with aspects of the present disclosure. The base station communications manager 1415 may be an example of aspects of a base station communications manager 1515 described with reference to FIGS. 12, 13, and 15. The base station communications manager 1415 may include uplink reception manager 1420, timing advance manager 1425, downlink transmission manager 1430, timing control signal manager 1435, timer function manager 1440, PTP manager 1445, timing accuracy manager 1450, resource scheduler 1455, resource identification manager 1460, timing synchronization manager 1465, and cellular metric manager 1470. Each of these modules may communicate, directly or indirectly, with one another (e.g., via one or more buses).

Uplink reception manager 1420 may receive uplink communications from a UE. In some cases, uplink reception manager 1420 may receive an indication of a time difference between a first reception time and a second reception time of the first signal at the UE. In some cases, the first reception time corresponds to an earliest instance of the first signal being received at the UE, and the second reception time corresponds to one or more later instances of the first signal being received at the UE.

Timing advance manager 1425 may adjust a time offset associated with the UE based at least in part on the indication of the time difference. In some cases, timing advance manager 1425 may determine a difference between the first reception time and the second reception time, determine a timing advance corresponding to a propagation delay between the first signal and the first reception time, and report the timing advance to the UE. In some cases, the propagation delay corresponds to a line-of-sight path of the first signal between the UE and the base station, and the second reception time is associated with one or more non-line-of-sight paths between the UE and the base station. In some cases, the timing advance corresponds to a time adjustment that used to determine the second signal transmission time.

Downlink transmission manager 1430 may transmit the first signal to the UE, and may transmit one or more other downlink transmissions to the UE.

Timing control signal manager 1435 may transmit a third signal to the UE, a timing of the third signal based on the first reception time, and the third signal including timing control signal to a device connected to the UE.

Timer function manager 1440 may configure a timer function of a local wired interface of the UE based on the first reception time. In some cases, the timer function provides a timing control signal to a device connected to the UE via the local wired interface. PTP manager 1445 may perform timing synchronization tasks in conjunction with the timer function. In some cases, the timer function is a precision timing protocol (PTP) function.

Timing accuracy manager 1450 may determine that a UE is to operate within a timing accuracy threshold and determine that the UE is to operate within the timing accuracy threshold includes the indication includes at least one of: determining that the UE is communicating a defined data type, determining that the UE is a defined UE type, receiving a signal from the UE conveying an indication of the timing accuracy threshold, receiving a signal from a network device conveying the indication of the timing accuracy threshold, or a combination thereof.

Resource scheduler 1455 may schedule periodic resources for a timing synchronization procedure to be performed with the UE, the periodic resources having a periodicity based on the timing accuracy threshold. In some cases, the periodic resources are used for at least one of: reception of a time synchronization measurement from the UE, transmission of a timing advance command to the UE, or combinations thereof.

Resource identification manager 1460 may transmit a signal to the UE identifying the periodic resources.

Timing synchronization manager 1465 may perform the timing synchronization procedure with the UE according to the periodicity and using the periodic resources and communicate one or more signals with the UE that are transmitted using the periodic resources during the timing synchronization procedure.

Cellular metric manager 1470 may determine that at least one metric of a cellular wireless communication link between the base station and the UE satisfies a threshold and schedule the periodic resources for the timing synchronization procedure based on the determination. In some cases, the at least one metric of the cellular wireless communication link includes at least one of: a RSRP, a SNR, a SINR, a RSRQ, a bandwidth parameter, a throughput parameter, or a combination thereof.

Figure 15:
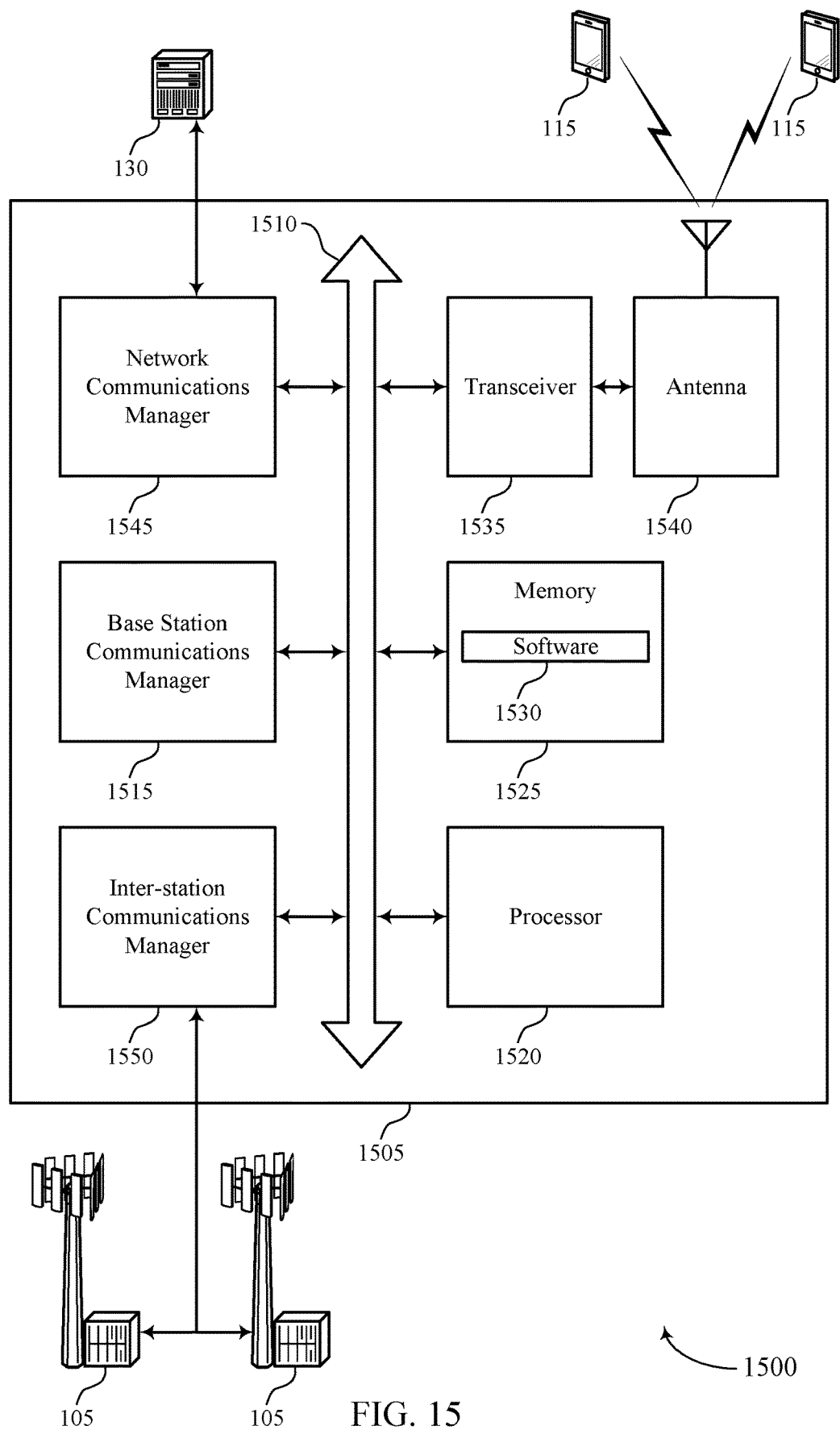
FIG. 15 illustrates a block diagram of a system including a base station that supports time synchronization techniques for wireless communications in accordance with aspects of the present disclosure.

FIG. 15 shows a diagram of a system 1500 including a device 1505 that supports time synchronization techniques for wireless communications in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting time synchronization techniques for wireless communications).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support time synchronization techniques for wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
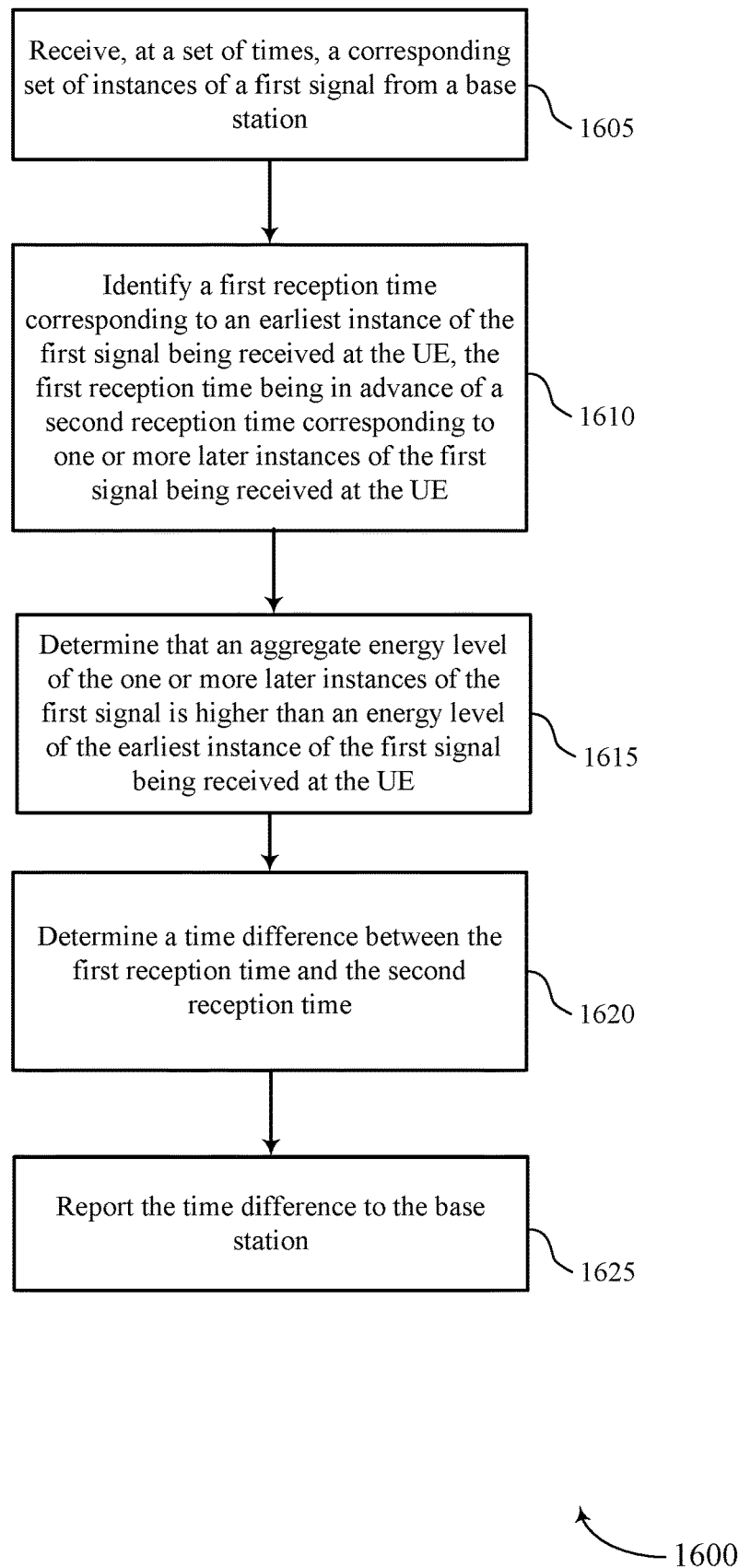
FIGS. 16 through 22 illustrate methods for time synchronization techniques for wireless communications in accordance with aspects of the present disclosure.

FIG. 16 shows a flowchart illustrating a method 1600 for time synchronization techniques for wireless communications in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, at a plurality of times, a corresponding plurality of instances of a first signal from a base station. The operations of 1605 may be performed according to the methods described herein. In certain examples, aspects of the operations of 1605 may be performed by a downlink reception manager as described with reference to FIGS. 8 through 11.

At 1610 the UE 115 may identify a first reception time corresponding to an earliest instance of the first signal being received at the UE. The operations of 1610 may be performed according to the methods described herein. In certain examples, aspects of the operations of 1610 may be performed by a timing advance manager as described with reference to FIGS. 8 through 11. In some cases, the first reception time may be in advance of a second reception time corresponding to one or more later instances of the first signal being received at the UE.

At 1615 the UE 115 may determine that an aggregate energy level of the one or more later instances of the first signal is higher than an energy level of the earliest instance of the first signal received at the UE. The operations of 1615 may be performed according to the methods described herein. In certain examples, aspects of the operations of 1615 may be performed by a timing advance manager as described with reference to FIGS. 8 through 11.

At 1620 the UE 115 may determine a time difference between the first reception time and the second reception time. The operations of 1620 may be performed according to the methods described herein. In certain examples, aspects of the operations of 1620 may be performed by a timing advance manager as described with reference to FIGS. 8 through 11.

At 1625 the UE 115 may report the time difference to the base station. The operations of 1625 may be performed according to the methods described herein. In certain examples, aspects of the operations of 1625 may be performed by an uplink transmission manager as described with reference to FIGS. 8 through 11.

Figure 17:
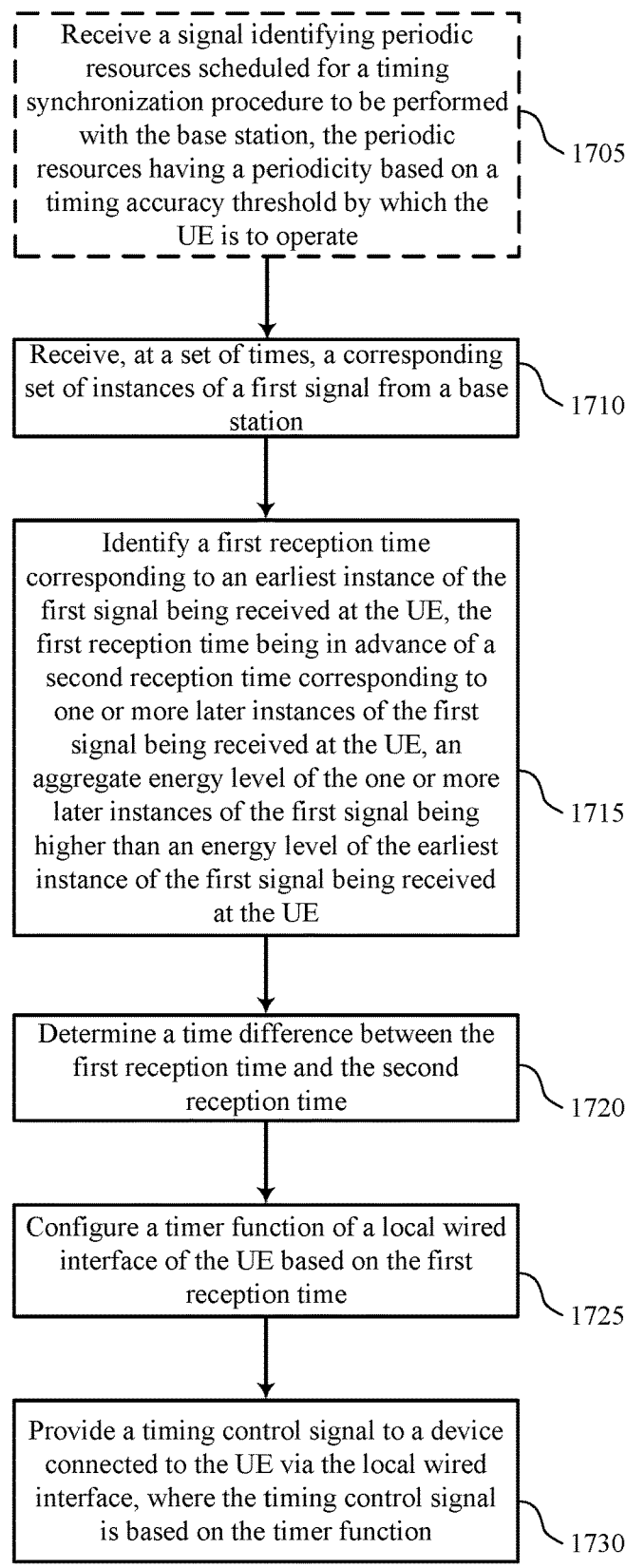

FIG. 17 shows a flowchart illustrating a method 1700 for time synchronization techniques for wireless communications in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

Optionally, at 1705 the UE 115 may receive a configuration signal identifying periodic resources scheduled for a timing synchronization procedure to be performed with the base station, the periodic resources having a periodicity based at least in part on a timing accuracy threshold by which the UE is to operate. The operations of 1705 may be performed according to the methods described herein. In certain examples, aspects of the operations of 1705 may be performed by a resource scheduler as described with reference to FIGS. 8 through 11.

At 1710 the UE 115 may receive, at a plurality of times, a corresponding plurality of instances of a first signal from a base station. In some cases, the first signal may be transmitted within a first instance of the periodic resources according to the timing synchronization procedure. The operations of 1710 may be performed according to the methods described herein. In certain examples, aspects of the operations of 1710 may be performed by a downlink reception manager as described with reference to FIGS. 8 through 11.

At 1715 the UE 115 may identify a first reception time corresponding to an earliest instance of the first signal being received at the UE, the first reception time being in advance of a second reception time corresponding to one or more later instances of the first signal being received at the UE, an aggregate energy level of the one or more later instances of the first signal being higher than an energy level of the earliest instance of the first signal being received at the UE. The operations of 1715 may be performed according to the methods described herein. In certain examples, aspects of the operations of 1715 may be performed by a timing advance manager as described with reference to FIGS. 8 through 11.

At 1720 the UE 115 may determine a time difference between the first reception time and the second reception time. The operations of 1720 may be performed according to the methods described herein. In certain examples, aspects of the operations of 1720 may be performed by a timing advance manager as described with reference to FIGS. 8 through 11.

At 1725 the UE 115 may configure a timer function of a local wired interface of the UE based at least in part on the first reception time. The operations of 1725 may be performed according to the methods described herein. In certain examples, aspects of the operations of 1725 may be performed by a timer function manager as described with reference to FIGS. 8 through 11.

At 1730 the UE 115 may provide a timing control signal to a device connected to the UE via the local wired interface, wherein the timing control signal is based at least in part on the timer function. The operations of 1730 may be performed according to the methods described herein. In certain examples, aspects of the operations of 1730 may be performed by a timing control signal manager as described with reference to FIGS. 8 through 11.

Figure 18:
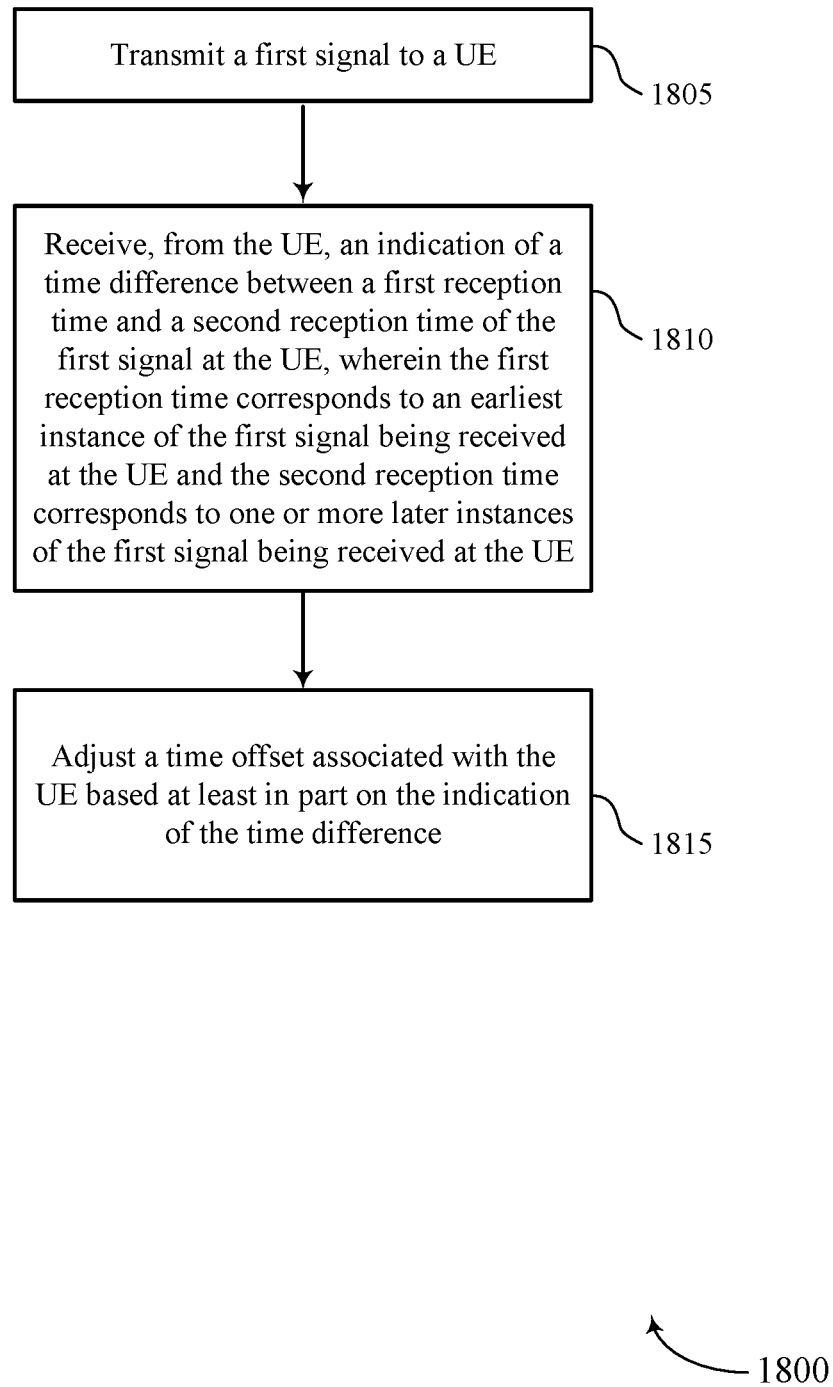

FIG. 18 shows a flowchart illustrating a method 1800 for time synchronization techniques for wireless communications in accordance with aspects of the present disclosure. The operations of method 1800 may be implemented by a base station 105 or its components as described herein. For example, the operations of method 1800 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit a first signal to a UE. The operations of 1805 may be performed according to the methods described herein. In certain examples, aspects of the operations of 1805 may be performed by a downlink transmission manager as described with reference to FIGS. 12 through 15.

At 1810 the base station 105 may receive, from the UE, an indication of a time difference between a first reception time and a second reception time of the first signal at the UE, where the first reception time corresponds to an earliest instance of the first signal being received at the UE and the second reception time corresponds to one or more later instances of the first signal being received at the UE. The operations of 1810 may be performed according to the methods described herein. In certain examples, aspects of the operations of 1810 may be performed by an uplink reception manager as described with reference to FIGS. 12 through 15.

At 1815 the base station 105 may adjust a time offset associated with the UE based at least in part on the indication of the time difference. The operations of 1815 may be performed according to the methods described herein. In certain examples, aspects of the operations of 1815 may be performed by a timing advance manager as described with reference to FIGS. 12 through 15.

Figure 19:
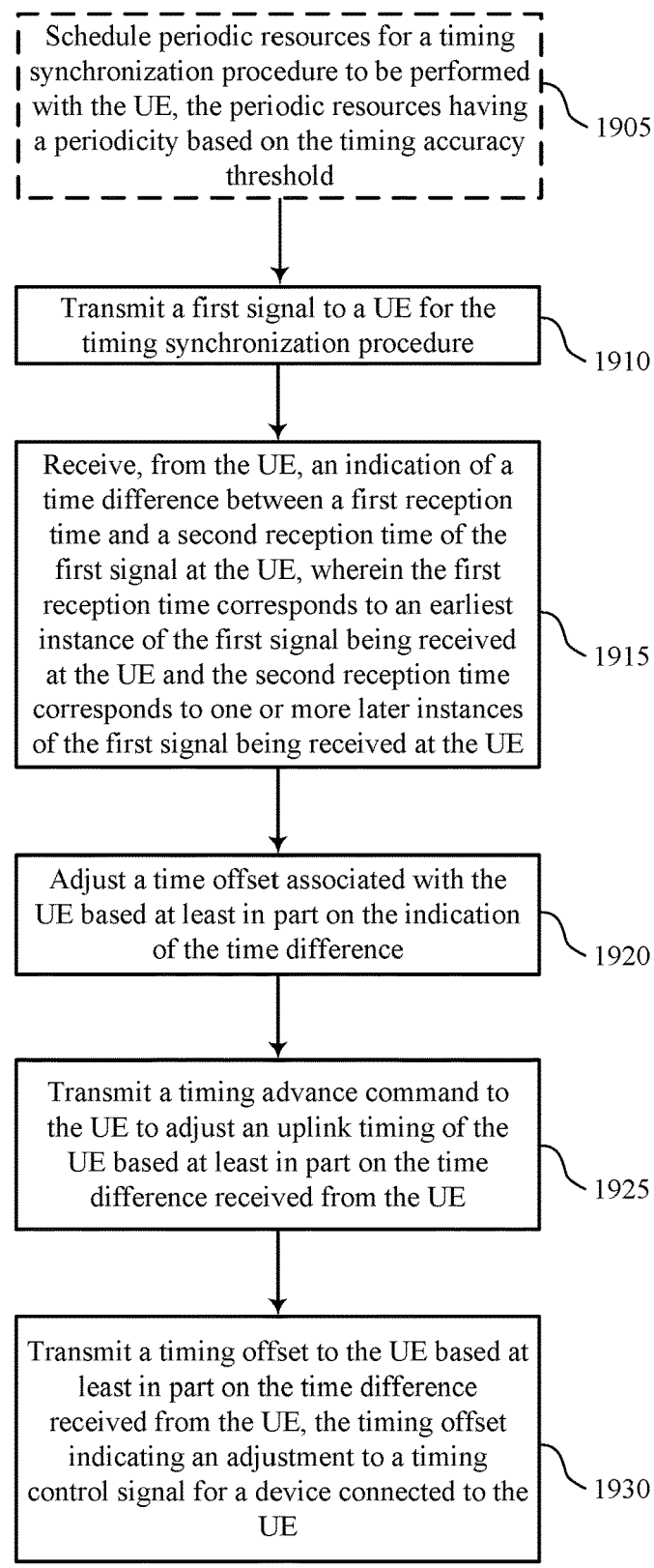

FIG. 19 shows a flowchart illustrating a method 1900 for time synchronization techniques for wireless communications in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may schedule periodic resources for a timing synchronization procedure to be performed with the UE, the periodic resources having a periodicity based at least in part on the timing accuracy threshold. The operations of 1505 may be performed according to the methods described herein. In certain examples, aspects of the operations of 1505 may be performed by a resource scheduler as described with reference to FIGS. 12 through 15.

At 1910 the base station 105 may transmit a first signal to a UE. In some cases, the first signal may be transmitted within a first instance of the periodic resources. The operations of 1910 may be performed according to the methods described herein. In certain examples, aspects of the operations of 1910 may be performed by a downlink transmission manager as described with reference to FIGS. 12 through 15.

At 1915 the base station 105 may receive, from the UE, an indication of a time difference between a first reception time and a second reception time of the first signal at the UE, where the first reception time corresponds to an earliest instance of the first signal being received at the UE and the second reception time corresponds to one or more later instances of the first signal being received at the UE. The operations of 1915 may be performed according to the methods described herein. In certain examples, aspects of the operations of 1915 may be performed by an uplink reception manager as described with reference to FIGS. 12 through 15.

At 1920 the base station 105 may adjust a time offset associated with the UE based at least in part on the indication of the time difference. The operations of 1920 may be performed according to the methods described herein. In certain examples, aspects of the operations of 1920 may be performed by a timing advance manager as described with reference to FIGS. 12 through 15.

At 1925 the base station 105 may transmit a timing advance command to the UE to adjust an uplink timing of the UE based at least in part on the time difference received from the UE. The operations of 1925 may be performed according to the methods described herein. In certain examples, aspects of the operations of 1925 may be performed by a timing advance manager as described with reference to FIGS. 12 through 15.

At 1930 the base station 105 may transmit a timing offset to the UE based at least in part on the time difference received from the UE, the timing offset indicating an adjustment to a timing control signal for a device connected to the UE. The operations of 1930 may be performed according to the methods described herein. In certain examples, aspects of the operations of 1930 may be performed by a timing advance manager as described with reference to FIGS. 12 through 15.

Figure 20:
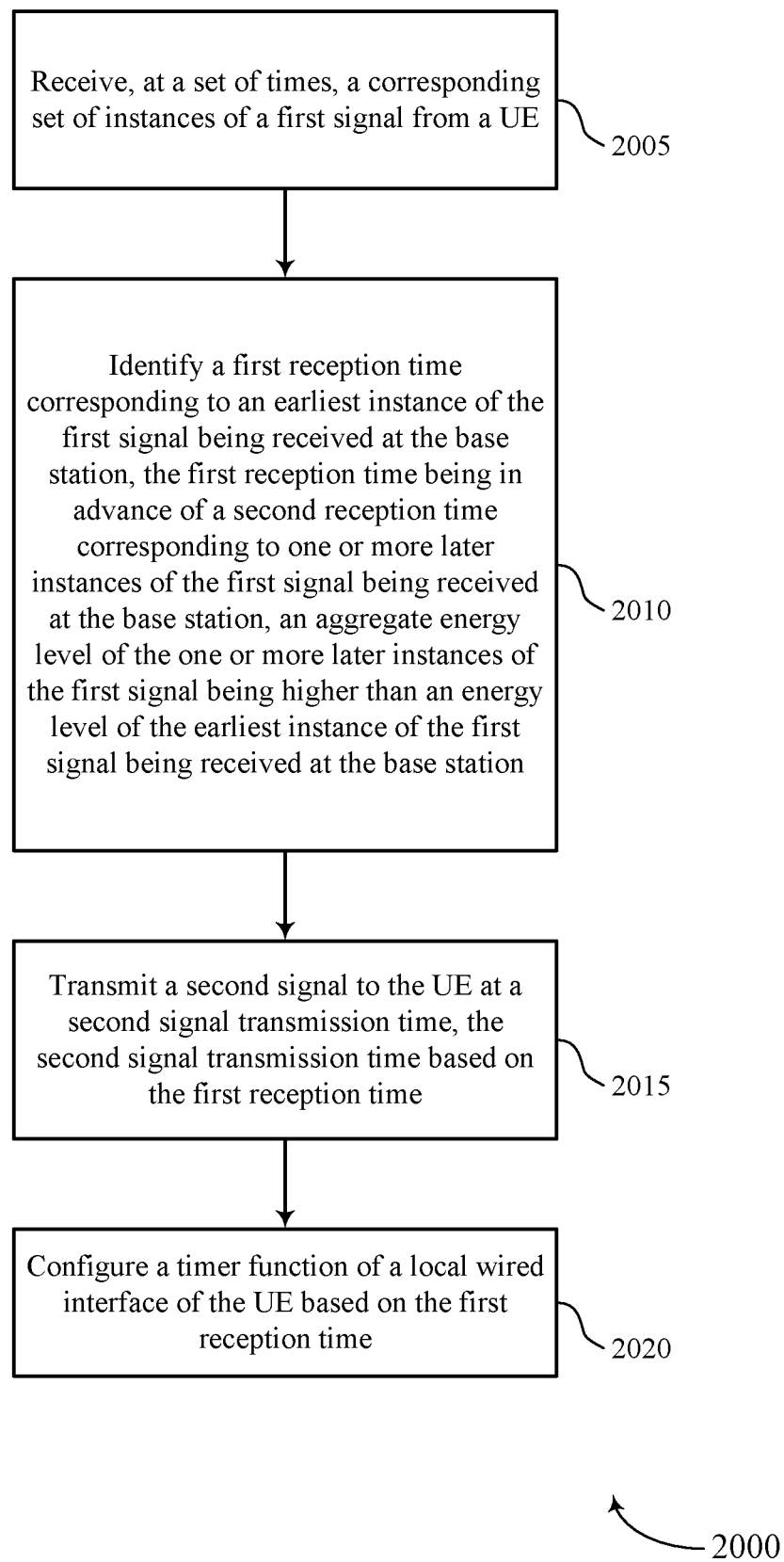

FIG. 20 shows a flowchart illustrating a method 2000 for time synchronization techniques for wireless communications in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may receive, at a plurality of times, a corresponding plurality of instances of a first signal from a user equipment (UE). The operations of 2005 may be performed according to the methods described herein. In certain examples, aspects of the operations of 2005 may be performed by a uplink reception manager as described with reference to FIGS. 12 through 15.

At 2010 the base station 105 may identify a first reception time corresponding to an earliest instance of the first signal being received at the base station, the first reception time being in advance of a second reception time corresponding to one or more later instances of the first signal being received at the base station, an aggregate energy level of the one or more later instances of the first signal being higher than an energy level of the earliest instance of the first signal being received at the base station. The operations of 2010 may be performed according to the methods described herein. In certain examples, aspects of the operations of 2010 may be performed by a timing advance manager as described with reference to FIGS. 12 through 15.

At 2015 the base station 105 may transmit a second signal to the UE at a second signal transmission time, the second signal transmission time based at least in part on the first reception time. The operations of 2015 may be performed according to the methods described herein. In certain examples, aspects of the operations of 2015 may be performed by a downlink transmission manager as described with reference to FIGS. 12 through 15.

At 2020 the base station 105 may configure a timer function of a local wired interface of the UE based at least in part on the first reception time. The operations of 2020 may be performed according to the methods described herein. In certain examples, aspects of the operations of 2020 may be performed by a timer function manager as described with reference to FIGS. 12 through 15.

Figure 21:
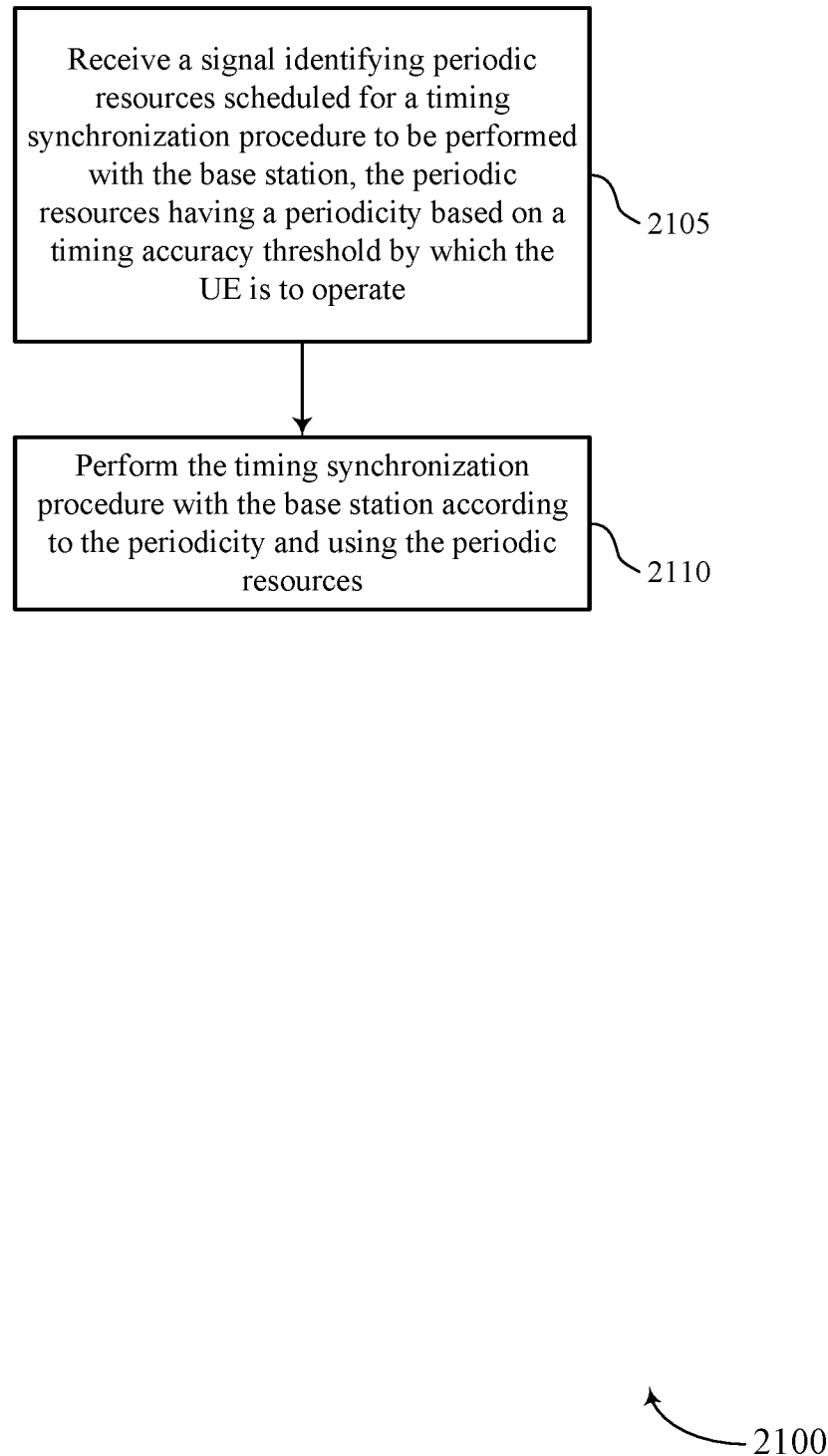

FIG. 21 shows a flowchart illustrating a method 2100 for modifying signaling periodicity for time synchronization in accordance with aspects of the present disclosure. The operations of method 2100 may be implemented by a UE 115 or its components as described herein. For example, the operations of method 2100 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 2105 the UE 115 may receive a signal identifying periodic resources scheduled for a timing synchronization procedure to be performed with the base station, the periodic resources having a periodicity based at least in part on a timing accuracy threshold by which the UE is to operate. The operations of 2105 may be performed according to the methods described herein. In certain examples, aspects of the operations of 2105 may be performed by a resource scheduler as described with reference to FIGS. 8 through 11.

At 2110 the UE 115 may perform the timing synchronization procedure with the base station according to the periodicity and using the periodic resources. The operations of 2110 may be performed according to the methods described herein. In certain examples, aspects of the operations of 2110 may be performed by a timing synchronization manager as described with reference to FIGS. 8 through 11.

Figure 22:
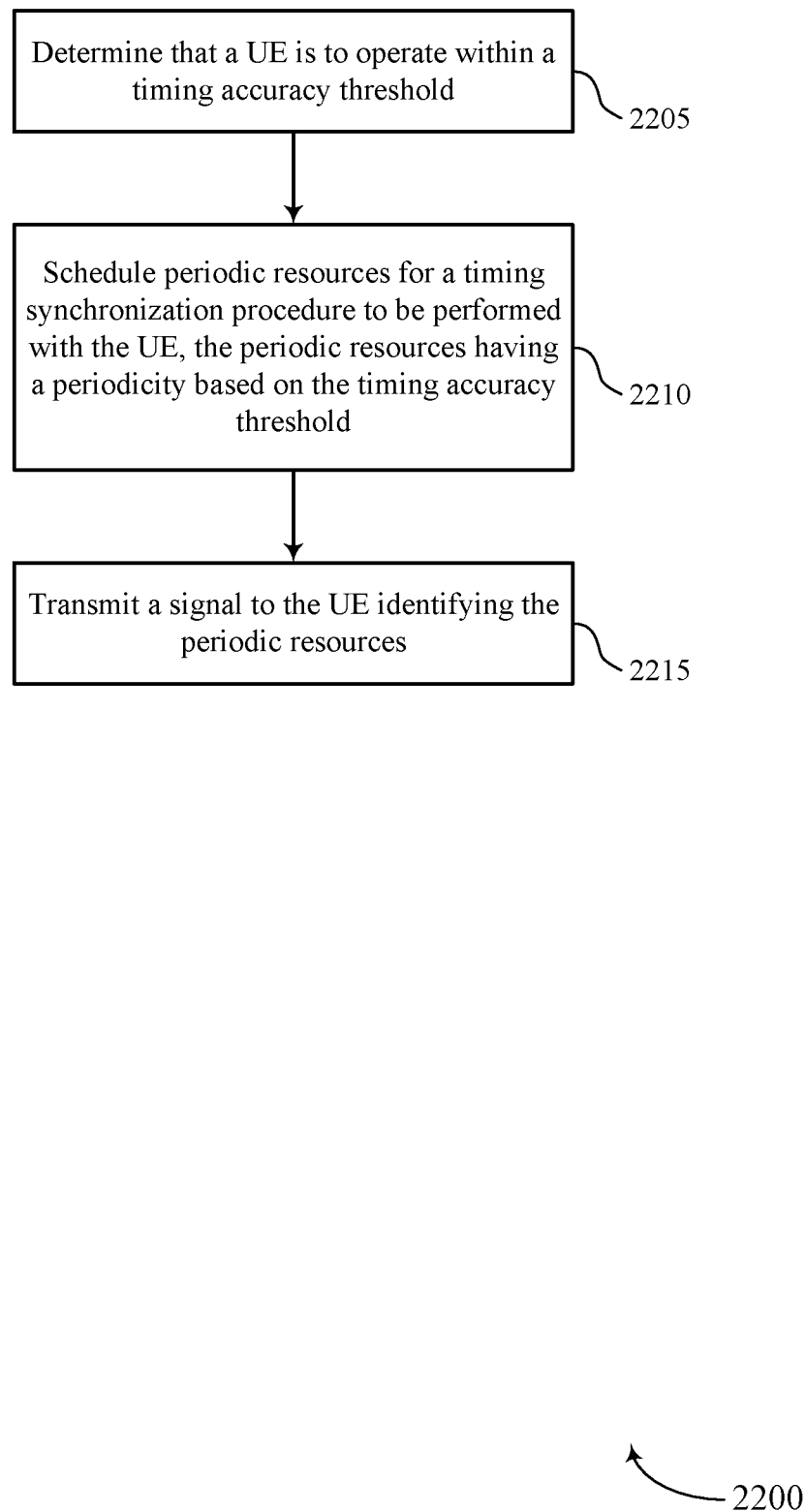

FIG. 22 shows a flowchart illustrating a method 2200 for modifying signaling periodicity for time synchronization in accordance with aspects of the present disclosure. The operations of method 2200 may be implemented by a base station 105 or its components as described herein. For example, the operations of method 2200 may be performed by a base station communications manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may determine that a UE is to operate within a timing accuracy threshold. The operations of 2205 may be performed according to the methods described herein. In certain examples, aspects of the operations of 2205 may be performed by a timing accuracy manager as described with reference to FIGS. 12 through 15.

At 2210 the base station 105 may schedule periodic resources for a timing synchronization procedure to be performed with the UE, the periodic resources having a periodicity based at least in part on the timing accuracy threshold. The operations of 2210 may be performed according to the methods described herein. In certain examples, aspects of the operations of 2210 may be performed by a resource scheduler as described with reference to FIGS. 12 through 15.

At 2215 the base station 105 may transmit a signal to the UE identifying the periodic resources. The operations of 2215 may be performed according to the methods described herein. In certain examples, aspects of the operations of 2215 may be performed by a resource identification manager as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, at the UE and at a plurality of times, a corresponding plurality of instances of a first signal from a base station;
   identifying a first reception time corresponding to an earliest instance of the first signal being received at the UE, the first reception time being in advance of a second reception time corresponding to one or more later instances of the first signal being received at the UE;
   determining that an aggregate energy level of the one or more later instances of the first signal is higher than an energy level of the earliest instance of the first signal being received at the UE;
   determining a time difference between the first reception time and the second reception time; and
   reporting the time difference to the base station.

2. The method of claim 1, further comprising:
   transmitting a third signal to a device coupled with the UE, a timing of the third signal based at least in part on the first reception time.

3. The method of claim 1, further comprising:
   receiving, from the base station, a configuration signal identifying periodic resources scheduled for a timing synchronization procedure, and wherein the first signal from the base station is transmitted in a first instance of the periodic resources according to the timing synchronization procedure.

4. The method of claim 3, wherein the periodic resources have a periodicity based at least in part on a timing accuracy threshold by which the UE is to operate, and wherein the periodicity of the periodic resources is further based at least in part on a reference signal received power (RSRP), a signal-to-noise ratio (SNR), a signal-to-interference-and-noise ratio (SINR), a reference signal received quality (RSRQ), a bandwidth parameter, a throughput parameter, or a combination thereof.

5. The method of claim 1, wherein the reporting the time difference to the base station comprises:
   determining a first timing advance and a second timing advance, the first timing advance corresponding to a first propagation delay between when the base station transmits the first signal and the second reception time, and the second timing advance corresponding to a second propagation delay between when the base station transmits the first signal and the first reception time; and
   reporting at least one of the first timing advance and the second timing advance to the base station.

6. The method of claim 5, wherein the first propagation delay corresponds to one or more non-line-of-sight paths of the first signal between the base station and the UE, and the second propagation delay corresponds to a line-of-sight path between the base station and the UE.

7. The method of claim 6, wherein the first timing advance corresponds to a first time adjustment that provides that a majority of received energy for transmissions between the UE and the base station is within a cyclic prefix duration configured for transmission between the UE and the base station, and the second timing advance corresponds to a second time adjustment that compensates for the second propagation delay.

8. The method of claim 1, wherein the determining the time difference between the first reception time and the second reception time includes one or more of:
   measuring each of the first reception time and the second reception time and calculating the time difference; or
   determining the time difference based at least in part on a cyclic prefix duration of the first signal.

9. The method of claim 1, further comprising:
   configuring a timer function of a local wired interface of the UE based at least in part on a clock offset with a master clock associated with the base station, wherein the clock offset is based at least in part on the time difference; and
   providing a timing control signal to a device connected to the UE via the local wired interface, wherein the timing control signal is based at least in part on the timer function.

10. The method of claim 9, wherein the timer function is a precision timing protocol (PTP) function, and wherein the device is an end device connected to the local wired interface and controlled by the UE.

11. The method of claim 1, further comprising:
    determining a frame boundary for communications with the base station based at least in part on the second reception time.

12. The method of claim 1, wherein the first signal comprises at least one of: a primary synchronization signal, a secondary synchronization signal, a system information block, a sounding reference signal, a positioning reference signal, or any combination thereof.

13. A method for wireless communication at a base station, comprising:
    transmitting a first signal to a user equipment (UE);
    receiving, from the UE, an indication of a time difference between a first reception time and a second reception time of the first signal at the UE, wherein the first reception time corresponds to an earliest instance of the first signal being received at the UE and the second reception time corresponds to one or more later instances of the first signal being received at the UE; and
    adjusting a time offset associated with the UE based at least in part on the indication of the time difference.

14. The method of claim 13, further comprising:
    transmitting a timing advance command to the UE to adjust an uplink timing of the UE, wherein the timing advance command is based at least in part on the time difference received from the UE.

15. The method of claim 13, further comprising:
    transmitting a timing offset to the UE based at least in part on the time difference received from the UE, wherein the timing offset indicates an adjustment to a timing control signal for a device connected to the UE.

16. The method of claim 13, further comprising:
    scheduling periodic resources for a timing synchronization procedure to be performed with the UE, wherein the first signal is transmitted to the UE in a first instance of the periodic resources according to the timing synchronization procedure, and wherein the periodic resources have a periodicity based at least in part on a timing accuracy threshold by which the UE is to operate; and transmitting, prior to transmitting the first signal, a configuration signal to the UE identifying the periodic resources.

17. The method of claim 13, wherein the first reception time corresponds to a line-of-sight path of the first signal between the UE and the base station, and the second reception time is associated with one or more non-line-of-sight paths between the UE and the base station.

18. The method of claim 13, further comprising:
configuring a timer function of a local wired interface of the UE based at least in part on the time difference received from the UE.

19. The method of claim 18, wherein the timer function is a precision timing protocol (PTP) function, and the timer function provides a timing control signal to a device connected to the UE via the local wired interface.

20. An apparatus for wireless communication, comprising:
a processor;
memory in electronic communication with the processor; and
instructions stored in the memory and executable by the processor to cause the apparatus to:
receive, at a user equipment (UE) and at a plurality of times, a corresponding plurality of instances of a first signal from a base station;
identify a first reception time corresponding to an earliest instance of the first signal being received at the UE, the first reception time being in advance of a second reception time corresponding to one or more later instances of the first signal being received at the UE;
determine that an aggregate energy level of the one or more later instances of the first signal is higher than an energy level of the earliest instance of the first signal being received at the UE
determine a time difference between the first reception time and the second reception time; and
reporting the time difference to the base station.

21. The apparatus of claim 20, wherein the instructions are further executable by the processor to cause the apparatus to:
transmit a third signal to a device coupled with the UE, a timing of the third signal based at least in part on the first reception time.

22. The apparatus of claim 20, wherein the instructions are further executable by the processor to cause the apparatus to:
determine a first timing advance and a second timing advance, the first timing advance corresponding to a first propagation delay between when the base station transmits the first signal and the second reception time, and the second timing advance corresponding to a second propagation delay between when the base station transmits the first signal and the first reception time; and
report at least one of the first timing advance and the second timing advance to the base station.

23. The apparatus of claim 22, wherein the first propagation delay corresponds to one or more non-line-of-sight paths of the first signal between the base station and the UE, and the second propagation delay corresponds to a line-of-sight path between the base station and the UE.

24. The apparatus of claim 23, wherein the first timing advance corresponds to a first time adjustment that provides that a majority of received energy for transmissions between the UE and the base station is within a cyclic prefix duration configured for transmission between the UE and the base station, and the second timing advance corresponds to a second time adjustment that compensates for the second propagation delay.

25. The apparatus of claim 20, wherein the instructions are further executable by the processor to cause the apparatus to:
measure each of the first reception time and the second reception time and calculate the time difference; or
determine the time difference based at least in part on a cyclic prefix duration of the first signal.

26. The apparatus of claim 20, wherein the instructions are further executable by the processor to cause the apparatus to:
configure a timer function of a local wired interface of the UE based at least in part on a clock offset with a master clock associated with the base station, wherein the clock offset is based at least in part on the time difference; and
provide a timing control signal to a device connected to the UE via the local wired interface, wherein the timing control signal is based at least in part on the timer function.

27. An apparatus for wireless communication at a base station, comprising:
a processor;
memory in electronic communication with the processor; and
instructions stored in the memory and executable by the processor to cause the apparatus to:
transmit a first signal to a user equipment (UE);
receive, from the UE, an indication of a time difference between a first reception time and a second reception time of the first signal at the UE, wherein the first reception time corresponds to an earliest instance of the first signal being received at the UE, and the second reception time corresponds to one or more later instances of the first signal being received at the UE; and
adjust a time offset associated with the UE based at least in part on the indication of the time difference.

28. The apparatus of claim 27, wherein the instructions are further executable by the processor to cause the apparatus to:
transmit a timing advance command to the UE to adjust an uplink timing of the UE, wherein the timing advance command is based at least in part on the time difference received from the UE.

29. The apparatus of claim 27, further comprising:
transmitting a timing offset to the UE based at least in part on the time difference received from the UE, wherein the timing offset indicates an adjustment to a timing control signal for a device connected to the UE.

30. The apparatus of claim 27, wherein the first reception time corresponds to a line-of-sight path of the first signal between the UE and the base station, and the second reception time is associated with one or more non-line-of-sight paths between the UE and the base station.

* * * * *